(12) United States Patent
Kano et al.

(10) Patent No.: US 6,869,036 B2
(45) Date of Patent: Mar. 22, 2005

(54) RECORDING AND/OR REPRODUCING APPARATUS

(75) Inventors: Yasuaki Kano, Kanagawa (JP); Katsumi Maekawa, Tokyo (JP); Atsushi Mitani, Tokyo (JP); Tsuyoshi Toukairin, Kanagawa (JP)

(73) Assignee: Sony Corporation, Tokyo (JP)

(*) Notice: Subject to any disclaimer, the term of this patent is extended or adjusted under 35 U.S.C. 154(b) by 26 days.

(21) Appl. No.: 10/624,292

(22) Filed: Jul. 21, 2003

(65) Prior Publication Data

US 2004/0104297 A1 Jun. 3, 2004

(30) Foreign Application Priority Data

Jul. 22, 2002 (JP) ...................................... 2002-213046

(51) Int. Cl.[7] .............................................. B65H 75/28
(52) U.S. Cl. ............................... 242/332.4; 242/532.7; 360/95
(58) Field of Search ........................... 242/332.1, 332.4, 242/332.8, 532.1, 532.6, 532.7; 360/95

(56) References Cited

U.S. PATENT DOCUMENTS

| 4,608,614 | A | * | 8/1986 | Rinkleib et al. ............... 360/95 |
| 4,704,645 | A | * | 11/1987 | Murphy et al. ................ 360/95 |
| 5,325,249 | A | * | 6/1994 | Butts et al. .................... 360/95 |
| 6,151,188 | A | * | 11/2000 | Takano et al. ................. 360/95 |
| 6,278,572 | B1 | * | 8/2001 | Kletzl et al. ................... 360/95 |
| 6,565,028 | B2 | * | 5/2003 | Sasaki et al. ............. 242/332.4 |
| 6,592,063 | B2 | * | 7/2003 | Tatsumi et al. .......... 242/332.4 |
| 6,626,387 | B1 | * | 9/2003 | Hamming ................ 242/332.4 |

* cited by examiner

*Primary Examiner*—William A. Rivera
(74) *Attorney, Agent, or Firm*—Frommer Lawrence & Haug LLP; William S. Frommer

(57) ABSTRACT

There is provided a recording and/or reproducing apparatus including: a cartridge loading member into which is loaded a tape cartridge having a magnetic tape provided with a leader block on one end; a take-up mechanism for winding the magnetic tape; a carrying mechanism for carrying a tape pulling member, which engages with the leader block and pulls the magnetic tape from the tape cartridge, between the tape cartridge and the take-up mechanism; and a magnetic head mechanism for recording or reproducing signals. An area in which the cartridge loading member is formed, and an area in which the take-up mechanism, the carrying mechanism and the magnetic head mechanism are formed are divided by a partition, and the partition has an opening, and a shutter mechanism for shutting the opening. Thus, a recording and/or reproducing apparatus capable of preventing dust and the like from entering into the drive area is provided.

3 Claims, 17 Drawing Sheets

FIG. 9

RECORDING AND/OR REPRODUCING APPARATUS

CROSS REFERENCE TO RELATED APPLICATIONS

The present document claims priority to Japanese Priority Document JP2002-213046, filed in the Japanese Patent Office on Jul. 22, 2002, the entire contents of which are incorporated herein by reference to the extent permitted by law.

BACKGROUND OF THE INVENTION

1. Field of the Invention

The present invention relates to a recording and/or reproducing apparatus for a tape cartridge having a leader block to which a magnetic tape is attached.

2. Description of the Related Art

Conventionally, a tape recording and/or reproducing apparatus that uses a tape cartridge of a single reel type has been known. As shown in FIG. 20, such a recording and/or reproducing apparatus 200 has, within a substantially rectangular main body 201, a cartridge loading mechanism 203 into which a tape cartridge 202 is loaded, a rotary magnetic head mechanism 205 for recording or reproducing information signals on or from a magnetic tape 204 wound in the tape cartridge 202, a take-up reel constituting a take-up mechanism for the magnetic tape 204 that is fed to the inside of the main body 201, and a carrying mechanism 207 for carrying the magnetic tape 204 between the tape cartridge 202 and the take-up reel 206.

This recording and/or reproducing apparatus 200 has the cartridge loading mechanism 203 provided on one end, in the longitudinal direction, of the main body 201, and has the take-up reel 206 provided on the other end of the main body 201. In addition, there is provided the carrying mechanism 207 towards the upper portion of the recording and/or reproducing apparatus 200 and the carrying mechanism 207 spans the rotary magnetic head mechanism 205 and the take-up reel 206. The carrying mechanism 207 is engaged with a leader block 210 attached to the tip of the magnetic tape 204 of the tape cartridge 202. The carrying mechanism has carrying means for carrying the leader block 210 between the tape cartridge 202 and the take-up reel 206, and chucking means for engaging the leader block 210 and the carrying means or for freeing this engagement.

The leader block 210, by which the magnetic tape 204 is clamped, is chucked by the chucking means of the carrying mechanism 207, is pulled out by the carrying means and is guided up to the take-up reel 206. After the leader block 210 is loaded around the rotary magnetic head mechanism 205, the magnetic tape 204 is run by having the magnetic tape 204 wound around the take-up reel 206.

Such a recording and/or reproducing apparatus 200 is used in, for example, libraries equipped with changer functions realized by robot arms and in which a plurality of the tape cartridges 202 of a single reel type, in which various information signals are recorded, are provided. In such libraries, because it becomes an obstacle in inserting or taking out the tape cartridge 202 with the robot arm, no cover member is provided at all over the insertion/ejection opening section 213 for the tape cartridge 202 provided on the front face side of the main body 201.

SUMMARY OF THE INVENTION

As described above, in the recording and/or reproducing apparatus 200 used in this type of library, a cover member is not provided over the insertion/ejection opening section 213 of the main body 201, and is open all the time. In addition, because the magnetic tape 204 inside the tape cartridge 202 is pulled out from the cartridge to the side of the take-up reel 206, the cartridge loading mechanism 203 and the take-up reel 206 are always in standby mode, and the chucking means of the carrying mechanism 207 as well as the leader block 210 of the magnetic tape 204 chucked by the chucking means are made movable.

In other words, when the tape cartridge is not loaded into the recording and/or reproducing apparatus 200, the inside of the main body 201 is exposed to the outside. Therefore, dust can easily enter into the recording and/or reproducing apparatus 200 from the insertion/ejection opening section 213, and stick to the rotary magnetic head mechanism 205, the take-up reel 206, the carrying mechanism 207 and the like, thereby lowering drive performance, or compromising information signal recording and reproductive performance.

In view of such problems, the present invention provides a recording and/or reproducing apparatus that is used in libraries and the like and which is capable of preventing dust from entering into the drive area even when no cover member is provided over the insertion/ejection opening section for tape cartridges.

An embodiment of a recording and/or reproducing apparatus according to the present invention, includes: a cartridge loading member which is provided on one end side of the main body, and into which a tape cartridge, in which a magnetic tape with a leader block provided on one end thereof is wound, is loaded; a take-up mechanism provided on the other end of the main body and which winds the magnetic tape pulled out from the tape cartridge; a carrying mechanism equipped with an engaging shaft that engages with an engaging section of the leader block provided on one end of the magnetic tape and a tape pulling member for pulling out the magnetic tape from the tape cartridge, and which carries the tape pulling member between the tape cartridge loaded into the cartridge loading member and the take-up mechanism; and a rotary magnetic head mechanism for recording or reproducing information signals on or from the magnetic tape, and which is positioned between the cartridge loading member and the take-up mechanism. The area in which the cartridge loading member is formed (cartridge loading area) and the area in which the take-up mechanism, the feeding mechanism and the rotary magnetic head mechanism are formed (drive area) are divided by a partition, and an opening section from which the magnetic tape is pulled out and a shutter mechanism are formed in the partition.

As described above, according to an embodiment of the recording and/or reproducing apparatus of the present invention, because a partition is provided between the cartridge loading area and the drive area, and the opening section formed in the partition is opened and closed in conjunction with the insertion or ejection of the tape cartridge, even if dust enters into the apparatus from the insertion/ejection opening section for the tape cartridge, the dust can be prevented from further entering into the drive area by shutting the opening section of the partition.

BRIEF DESCRIPTION OF THE DRAWINGS

FIG. 9 is a perspective view showing, with a carrying mechanism omitted, the interior of a recording and/or reproducing apparatus to which the present invention is applied;

DESCRIPTION OF THE PREFERRED EMBODIMENTS

Figure 1:
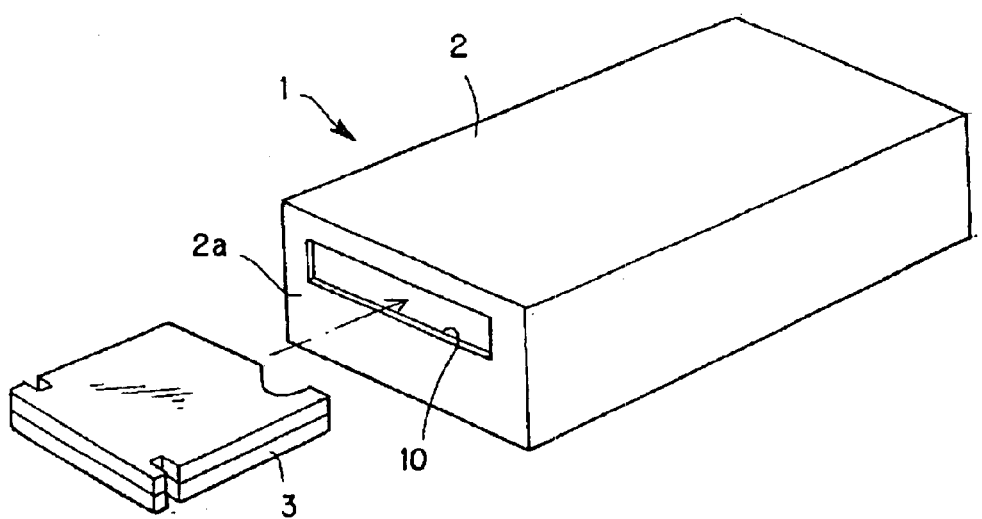
FIG. 1 is a perspective view showing the exterior of a recording and/or reproducing apparatus to which the present invention is applied.
Figure 2:
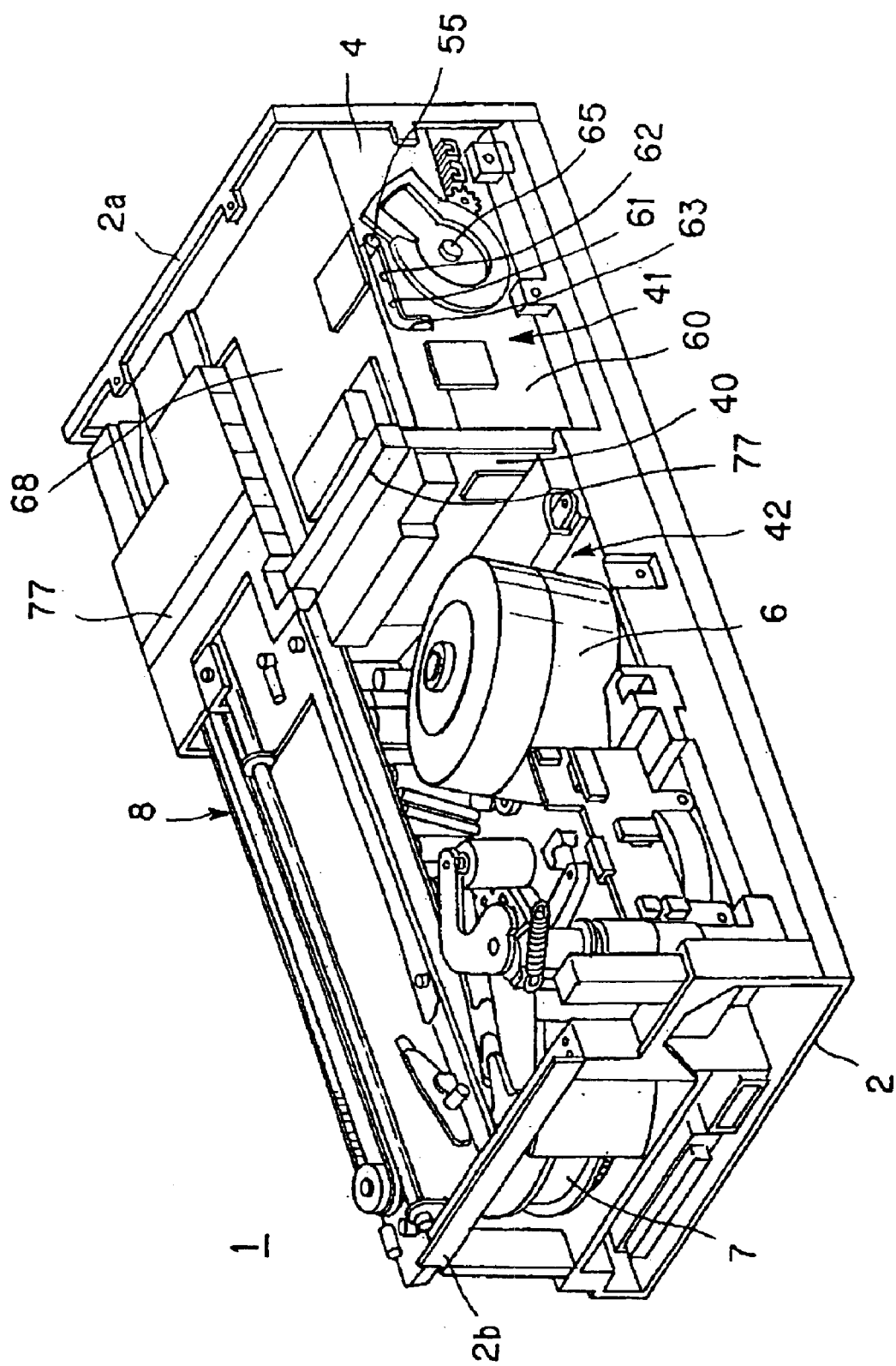
FIG. 2 is a perspective view showing the interior of a recording and/or reproducing apparatus to which the present invention is applied.

Hereinafter, a recording and/or reproducing apparatus to which the present invention is applied will be described in detail with reference to the accompanying drawings. In a recording and/or reproducing apparatus 1, a single reel type tape cartridge is used. As illustrated in FIG. 1 and FIG. 2, the recording and/or reproducing apparatus 1 includes, within a substantially rectangular main body 2: a cartridge loading mechanism 4 for loading a tape cartridge 3; a rotary magnetic head mechanism 6 for recording or reproducing information signals on or from a magnetic tape 5 wound in the tape cartridge 3; a take-up reel 7 constituting a take-up mechanism for winding the magnetic tape 5 fed to the inside of the main body 2; and a carrying mechanism 8 for carrying the magnetic tape 5 between the tape cartridge 3 and the take-up reel 7.

When the tape cartridge 3 is loaded into the cartridge loading mechanism 4, the recording and/or reproducing apparatus 1 pulls out the magnetic tape 5 from a cartridge main body 11 and carries the magnetic tape 5 to the take-up reel 7 by the carrying mechanism 8, and runs the magnetic tape 5 inside the main body 2 by winding the magnetic tape 5 with the take-up reel 7. Also, the recording and/or reproducing apparatus 1 records or reproduces information signals by winding the magnetic tape 5 fed from the tape cartridge 3 to the take-up reel 7 in contact with the rotary magnetic head mechanism 6 in an approximate M-shape.

Figure 3:
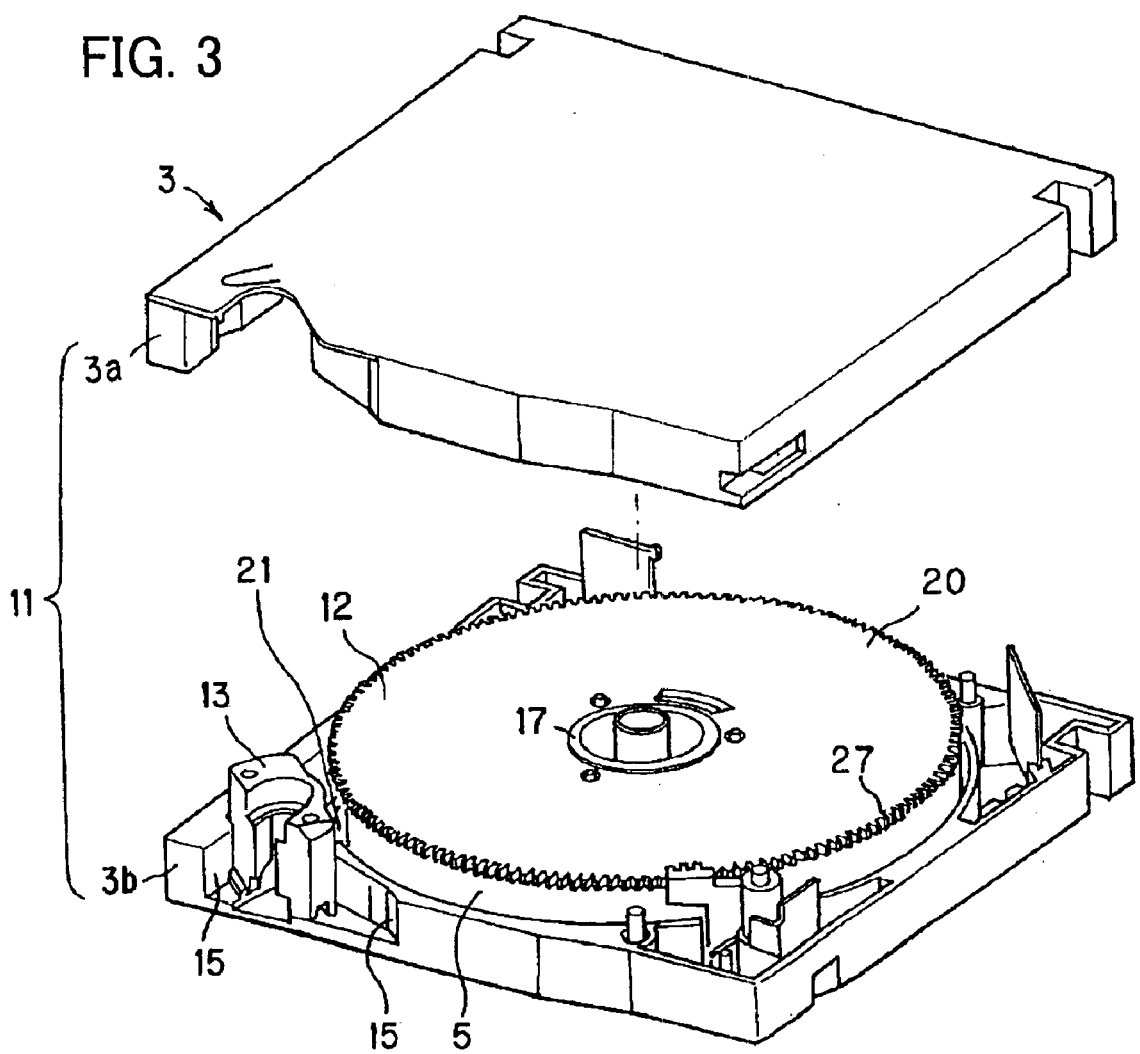
FIG. 3 is a perspective view showing a tape cartridge that is used in a recording and/or reproducing apparatus to which the present invention is applied.

A description of the tape cartridge 3, which is loaded into the recording and/or reproducing apparatus 1, will first be given. As illustrated in FIG. 3, the tape cartridge 3 houses inside the cartridge main body 11, which is formed by joining a pair of upper and lower halves 3a and 3b, a tape reel 12 around which the magnetic tape 5 is wound. When the tape cartridge 3 is inserted into the recording and/or reproducing apparatus 1, a leader block 13 by which the magnetic tape 5 is clamped is pulled out by a tape pulling member of the recording and/or reproducing apparatus 1. The magnetic tape 5 is guided to the take-up reel 7 inside the recording and/or reproducing apparatus 1, and the magnetic tape 5 is run by being wound around the take-up reel 7.

Figure 4:
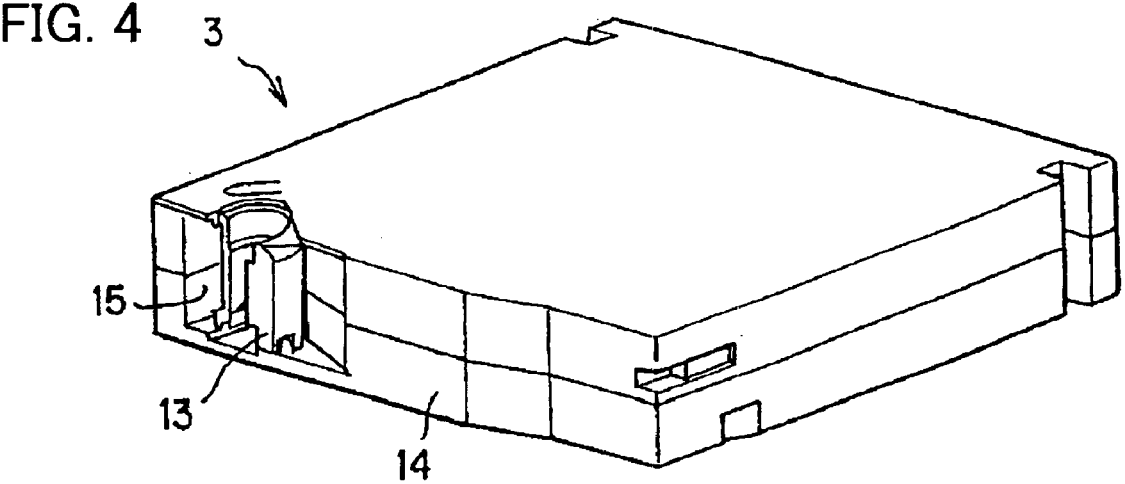
FIG. 4 is a perspective view showing a tape cartridge.

As illustrated in FIG. 4, an opening 15 for pulling out the magnetic tape 5 is formed in an outer peripheral wall 14 of the cartridge 11. The opening 15 is formed by removing a portion of one side surface of each of the upper and lower halves 3a and 3b and aligning the portions where the side surface has been partially removed. The leader block 13 by which one end of the magnetic tape 5 is clamped is latched in the opening 15, and the leader block 13 faces outward.

Figure 5:
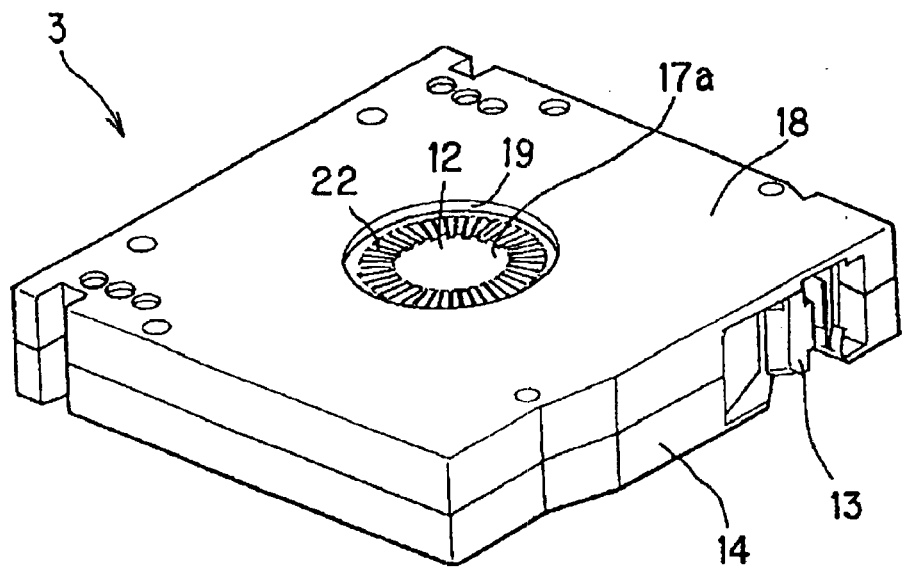
FIG. 5 is a perspective view showing the bottom portion of a tape cartridge.

As illustrated in FIG. 5, there is formed a reel drive section insertion hole 19 at a substantially center portion of a bottom plate 18 of the lower half 3b into which a reel drive section for rotating the tape reel 12 in the recording and/or reproducing apparatus 1 is inserted.

As illustrated in FIG. 3, the tape reel 12, which is rotatably housed in the cartridge main body 11 for winding the magnetic tape 5, includes a reel hub 17 around which the magnetic tape 5 is wound and a pair of reel flanges 20 and 21 attached to both sides of the reel hub 17.

One end of the magnetic tape 5 is attached to the reel hub 17. Also, an engaging portion 22 that engages with a reel drive section of the recording and/or reproducing apparatus 1 is formed on the side of the bottom surface 17a of the reel hub 17. The engaging portion 22 faces outward from the reel drive section insertion hole 19 in the lower half 3b. When the tape cartridge 3 is inserted into the recording and/or reproducing apparatus 1, the engaging portion 22 engages with the reel drive section of a reel rotary drive mechanism which is provided in the recording and/or reproducing apparatus 1 and is driven to rotate.

Various information signals such as audio signals, video signals, data processed by a computer and the like are recorded on the magnetic tape 5 wound around such a tape reel 12. The leader block 13 held and guided by the tape pulling member in the recording and/or reproducing apparatus 1 to the take-up reel 7 is attached to the tip of the magnetic tape 5 which is wound around the tape reel 12.

Figure 6:
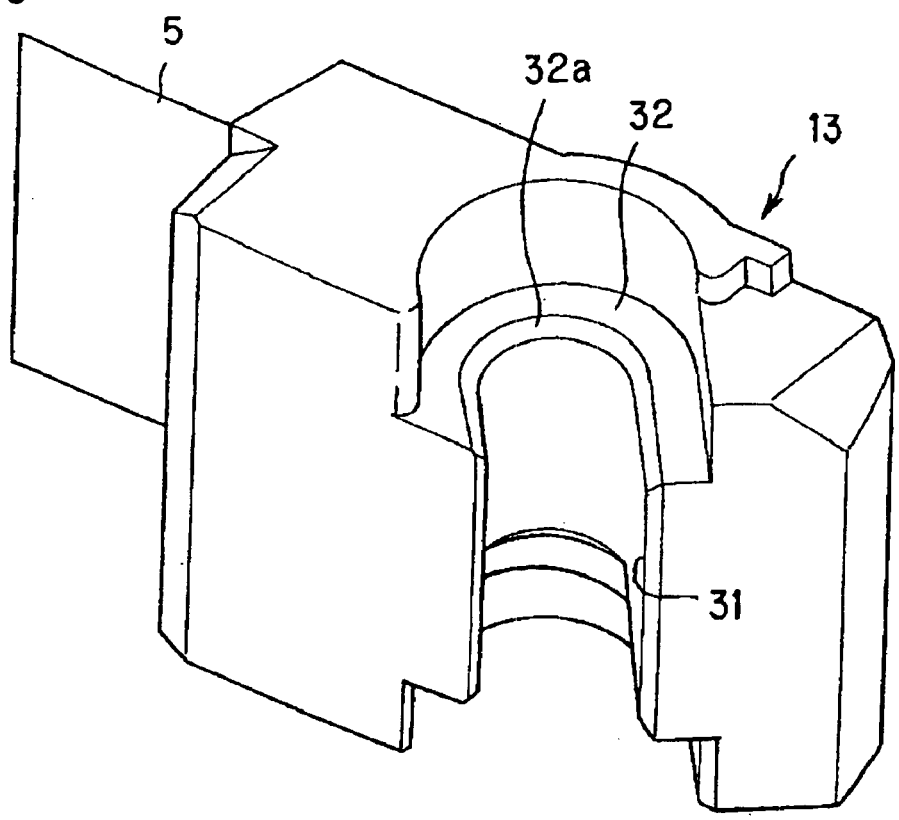
FIG. 6 is a perspective view of the upper surface side of a leader block.
Figure 7:
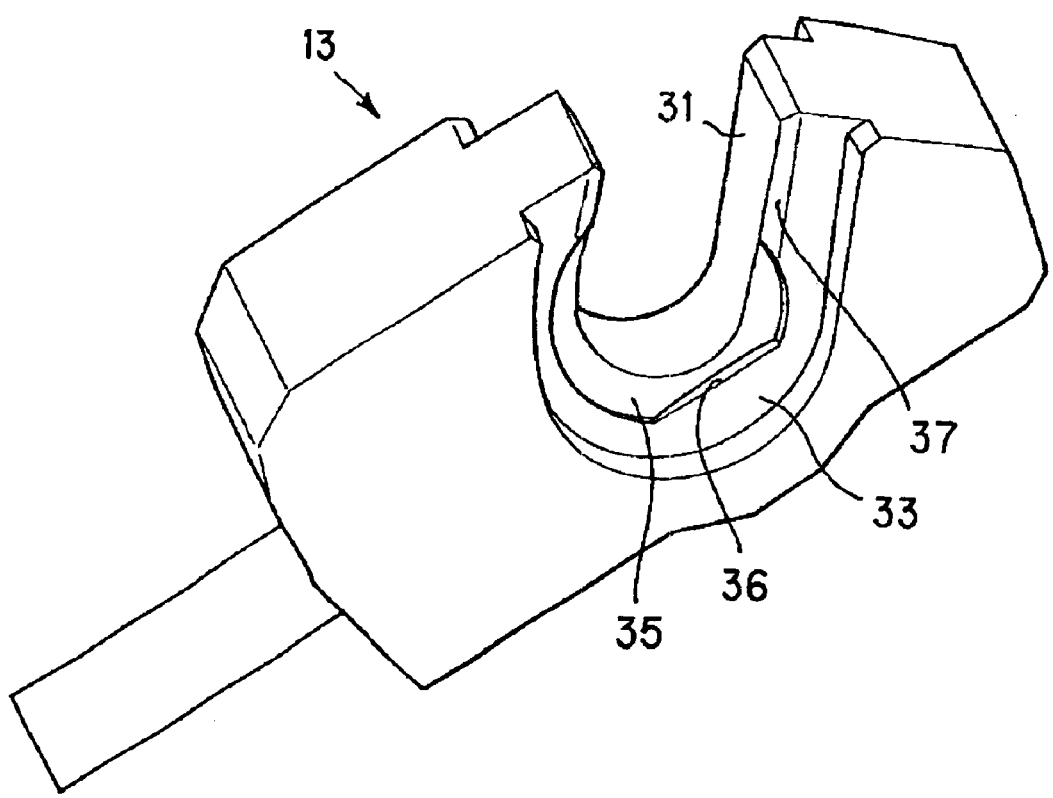
FIG. 7 is a perspective view of the lower surface side of a leader block.
Figure 8:
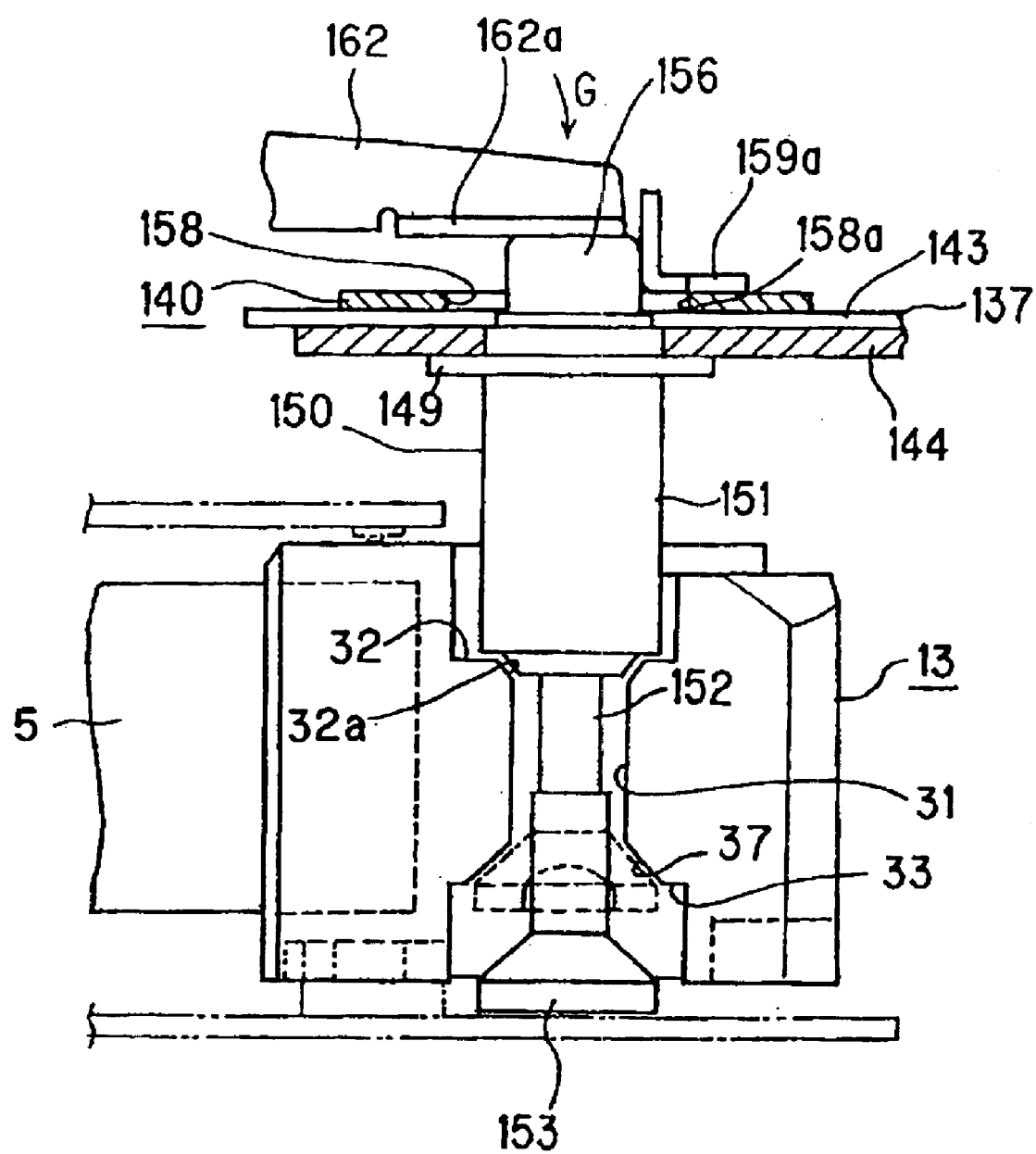
FIG. 8 is a cross-sectional view illustrating how an engaging shaft and a leader block are engaged.

As illustrated in FIG. 6 through FIG. 8, the leader block 13 has an engaging portion 31 into which a sleeve of the tape pulling member in the main body of the apparatus and an engaging shaft extending downward from the sleeve are inserted, an upper engaging step portion 32 which is formed on the upper portion side of the engaging portion 31 and which is for engaging the lower surface portion of the sleeve and a lower engaging step portion 33 formed on the lower portion side of the engaging portion 31 and which is for engaging a flange of the engaging shaft.

As illustrated in FIG. 6 and FIG. 7, the engaging portion 31 and the upper and lower engaging step portions 32 and 33 are formed such that their abutting portions against which the engaging shaft of the tape pulling member and the bottom surface portion of the sleeve are abutted have a substantially C-formed shape. The leader block 13 engages with the tape pulling member by having the engaging shaft abut against the engaging portion 31 and the upper and lower engaging step portions 32 and 33. In this manner, the leader block 13 is positioned upon engagement, thereby preventing the leader block 13 from rotating or shaking during while being carried.

The upper engaging step portion 32 has a positioning portion 32a formed at a position corresponding to the flange of the engaging shaft. The positioning portion 32a is formed as a slanted surface between the upper engaging step portion 32 and the engaging portion 31. When the leader block 13 engages with the tape pulling member, the positioning portion 32a contacts the flange formed on the engaging shaft. Accordingly, the leader block 13 engages securely with the engaging shaft.

Moreover, the leader block 13 has a positioning step portion 35 formed between the engaging portion 31 and the lower engaging step portion 33, and the flange of the engaging shaft contacts the positioning step portion 35. The positioning step portion 35 has a generally C-shaped abutting portion, and a rotation restriction portion 36 for restricting the rotation of the leader block 13 is formed at a portion of the inner circumference of the abutting portion and at a position corresponding to a chamfered portion formed on the flange of the engaging shaft. As illustrated in FIG. 7, the rotation restriction portion 36 is formed at a portion of the arcuate abutting portion in a form resembling the string of a bow. The rotation restriction portion 36 abuts against the chamfered portion formed on the flange of the engaging shaft which similarly resembles the shape of the string of a bow. The positioning step portion 35 also has a positioning portion 37 formed of a slanted surface provided at a position corresponding to the flange of the engaging shaft. When the leader block 13 engages with the tape pulling member, the positioning portion 37 abuts against the flange of the engaging shaft. As a result, the leader block 13 is securely positioned upon engagement with the tape pulling member, and is prevented from rotating or shaking while being carried.

When such a tape cartridge 3 is loaded into the cartridge loading mechanism 4 of the recording and/or reproducing apparatus 1, the tape pulling member of the carrying mechanism 8 enters into the opening 15 and engages with the leader block 13, which is then carried to the take-up reel 7. Upon completing recording or reproducing information signals on or from the magnetic tape 5, the tape cartridge 3 is ejected from the main body 2 of the apparatus after the magnetic tape 5 rewound.

Next, the recording and/or reproducing apparatus 1 for such a tape cartridge 3 will be described below.

The recording and/or reproducing apparatus 1 is applied to a library or the like, in which a plurality of single reel type tape cartridges 3 having various information signals recorded thereon and a changer mechanism including a robot arm are provided. In the library, the recording and/or reproducing apparatus 1 is provided with no cover member for an insertion/ejection opening section 10 for the tape cartridge 3 which is formed on the front face 2a side of the main body 2 as illustrated in FIG. 1, since such a cover member would become an obstacle for the robot arm in inserting or taking out the tape cartridge 3.

As illustrated in FIG. 2, in the recording and/or reproducing apparatus 1, the cartridge loading mechanism 4 is provided towards the front face 2a side of the main body 2 where the insertion/ejection opening section 10 is provided. The rotary magnetic head mechanism 6 is provided at a substantially center portion of the main body 2 of the apparatus, while the take-up reel 7 is provided towards the back face 2b side of the main body 2. A partition 40 is formed between the cartridge loading mechanism 4 and the rotary magnetic head mechanism 6, thereby dividing the main body 2 into a tape loading area 41 for loading the magnetic tape 5 wound in the tape cartridge 3 onto the tape pulling member of the carrying mechanism 8 which will be described later and a drive area 42 in which the magnetic tape 5 is carried by the carrying mechanism 8.

Figure 9:
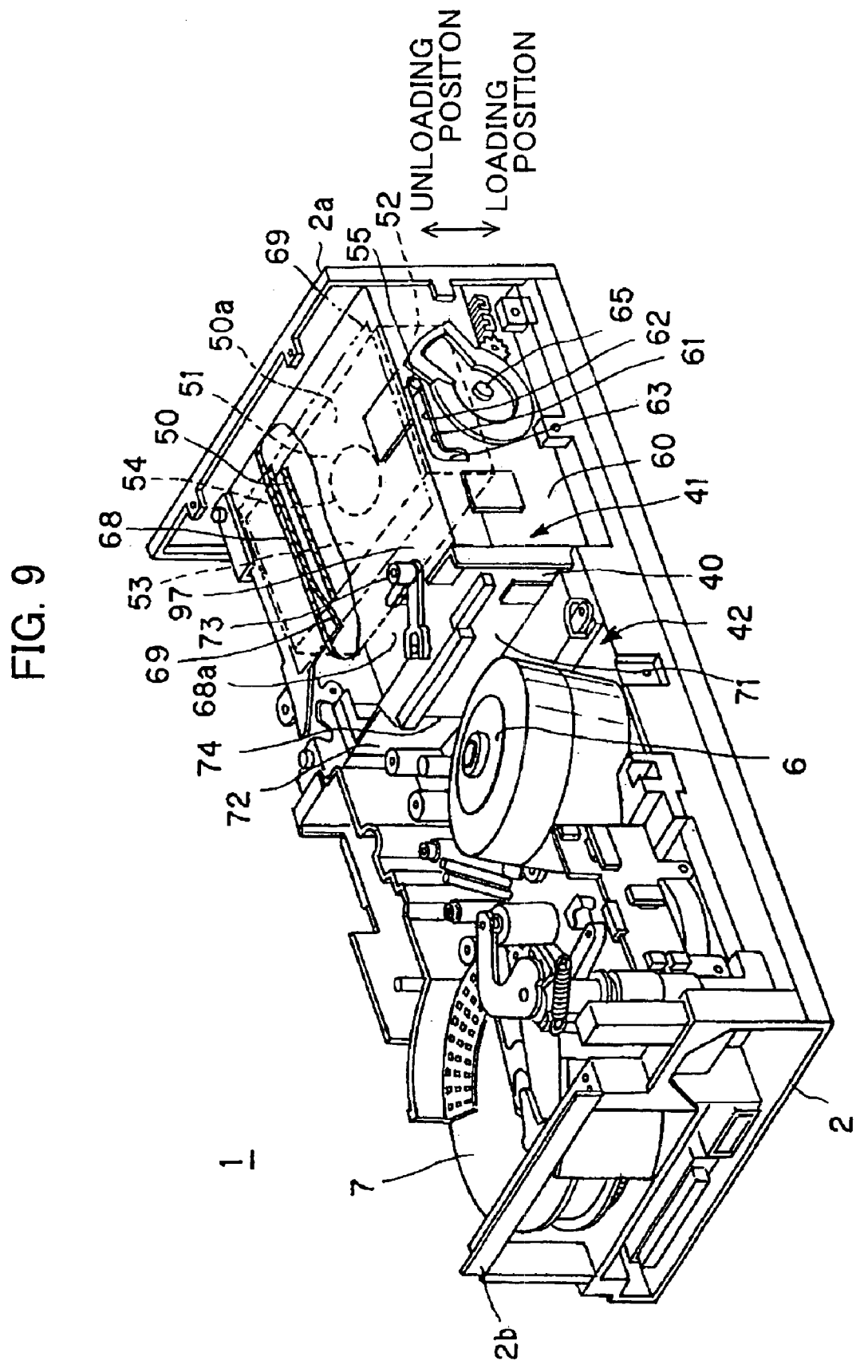

The cartridge loading mechanism 4 into which the tape cartridge 3 is loaded and which performs the loading and unloading of the tape cartridge 3 includes, as illustrated in FIG. 9 without the carrying mechanism 8: a cartridge holding member 50 having substantially the same size as the tape cartridge 3; a cam plate 60 for guiding the movement of the cartridge holding member 50; and a loading portion 65 for carrying the cartridge holding member 50 between the unloading position and the loading position by way of the cam plate 60. By being driven by the loading portion 65 and guided by the cam plate 60, the cartridge holding member 50 is moved up and down between an unloading position for performing insertion/ejection of the tape cartridge 3 and a loading position for pulling out the magnetic tape 5 into the drive area 42.

The cartridge holding member 50 is formed generally in the shape of a box, whose front and rear faces are open, and has a cartridge loading portion 51 of substantially the same size as the tape cartridge 3, walls 52, 52 erected from both edges of the cartridge loading portion 51 and an upper face portion 53. Additionally, the cartridge holding member 50 has an insertion end 50a for the tape cartridge 3 on one end in the insertion direction of the tape cartridge 3. When the cartridge holding member 50 is in the unloading position, the insertion end 50a faces outward from the insertion/ejection opening section 10 of the main body 2 of the apparatus.

At substantially the center portion of the cartridge loading portion 51 on which the tape cartridge 3 is placed, the cartridge holding member 50 has a reel drive section entry opening 54 into which a reel drive section (not shown) for rotationally driving the tape cartridge 3 enters. Also, guide pins 55 extending outward are provided on the walls 52, 52 of the cartridge holding member 50. The guide pins 55 engage slidably with guide grooves 61 which are formed in a pair of the cam plates 60 of the loading portion 65 which will be described later.

The cam plates 60 are disposed along the side surfaces of the main body 2 of the apparatus. Additionally, the cam plates 60 have the guide grooves 61 that slidably engage with the guide pins 55, which are provided on the pair of walls 52, 52 of the cartridge holding member 50, and the guide grooves 61 are formed in the cam plates 60 from the front face 2a side towards the back face 2b side of the main body 2 of the apparatus.

Each of the guide grooves 61 has a horizontal guide portion 62 which guides the cartridge holding member 50 in the horizontal direction and a vertical guide portion 63 which extends downward from one end of the horizontal guide portion 62 and which is for moving the cartridge holding member 50 down towards the loading position.

The horizontal guide portion 62 is formed from the front face 2a side towards the back face 2b side of the main body 2. The vertical guide portion 63 is formed to extend downward from the side of the horizontal guide portion 62 closer to the back face 2b.

Each of the guide grooves 61 slidably engages with the respective guide pin 55 of the cartridge holding member 50.

When the cartridge holding member 50 is moved along the side surfaces of the main body 2, the cartridge holding member 50 is guided horizontally or vertically by way of the guide pins 55.

The loading portions 65, which carry the cartridge holding member 50, are provided on the outer sides of the cam plates 60 and engage with the guide pins 55 which extend outward from the guide grooves 61 of the cam plates 60. By moving the guide pins 55, the cartridge holding member 50 is moved. By having the guide pins 55 moved by the loading portions 65 while guided by the guide grooves 61 in the cam plates 60, the cartridge holding member 50 is carried between the unloading position and the loading position.

When the cartridge holding member 50 is carried to the unloading position, the insertion end 50a is brought into alignment with the insertion/ejection opening section 10 on the front face 2a side of the main body 2 of the apparatus. Thus, a cartridge ejection mechanism, of which a detailed description is omitted, is able to eject the tape cartridge 3 outside the main body 2 of the apparatus so as to allow a user to pull the tape cartridge 3 out of the insertion/ejection opening 10, and it is also made possible to insert the tape cartridge 3 through the insertion/ejection opening section 10. On the other hand, when the cartridge holding member 50 is carried to the loading position, the opening 15 from which the leader block 13 of the loaded tape cartridge 3 faces outward is made to face the opening section formed in the partition 40 described later. Subsequently, the magnetic tape 5 inside the tape cartridge 3 is pulled out towards the drive area 42 by the carrying mechanism 8 by having the tape pulling member, which will be described later, and the leader block 13 attached to the tip of the magnetic tape 5 engaged with each other.

Figure 10:
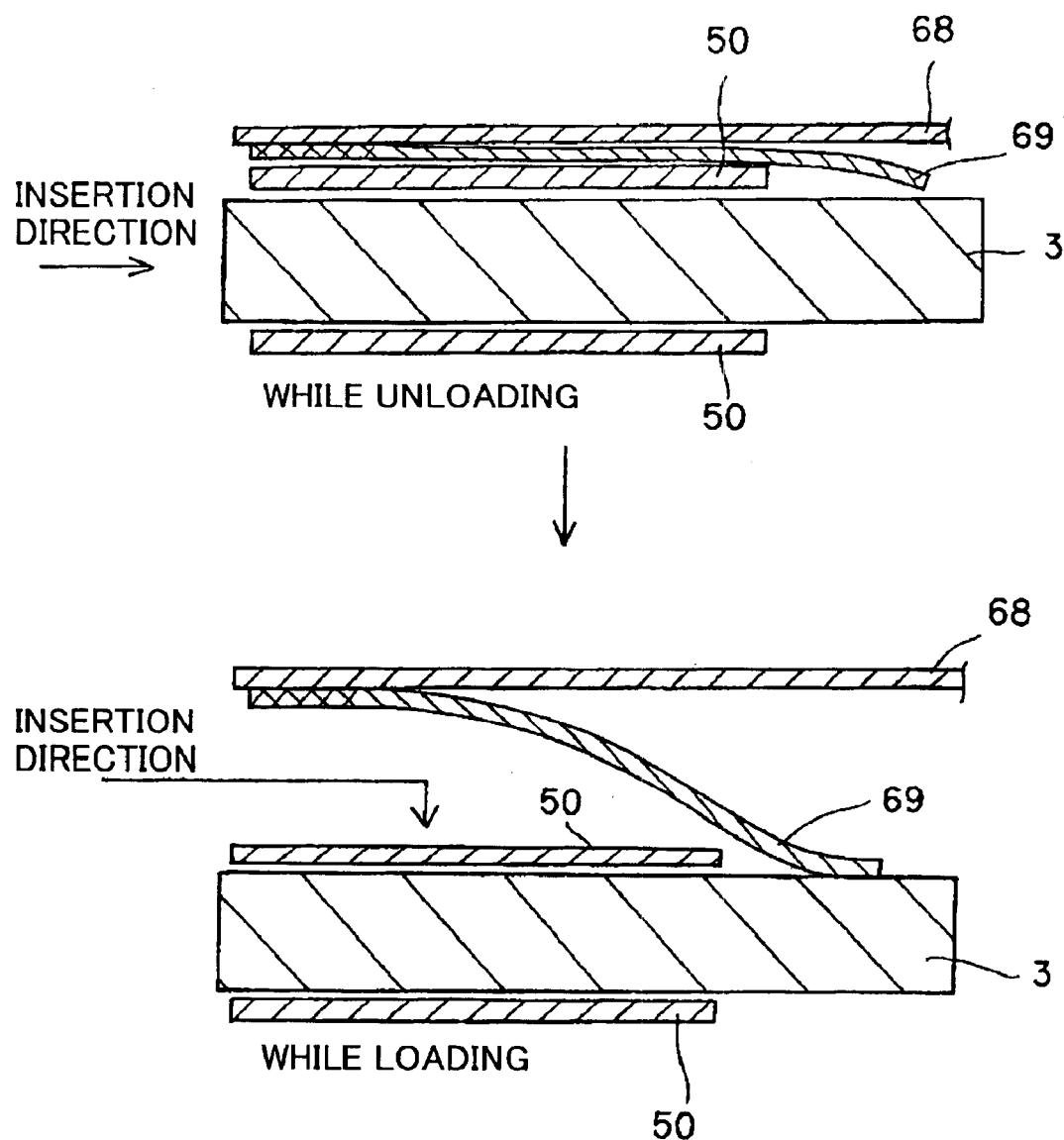
FIG. 10 is a diagram indicating how an antidust sheet works.

The tape loading area 41, in which the above-mentioned cartridge loading mechanism 4 is provided, has a top plate 68 over the upper face portion 53 of the cartridge holding member 50. The top plate 68 is positioned above the insertion/ejection opening section 10 formed in the front face 2a of the main body 2 of the apparatus, and is formed so as to seal the tape loading area 41 together with the cam plates 60. Additionally, a flexible antidust sheet 69 for preventing dust and the like from entering inside the drive area 42 is attached to the top plate 68. The antidust sheet 69 is a substantially rectangular sheet and is provided between the top plate 68 and the cartridge holding member 50 with one side attached to the top plate 68. As illustrated in FIG. 10, the antidust sheet 69 drapes over the upper face portion 53 of the cartridge holding member 50, and covers the clearance formed between the top plate 68 and the upper face portion 53 of the cartridge holding member 50.

When the cartridge holding member 50 is in the unloading position, the antidust sheet 69 is raised by the upper face portion 53 of the cartridge holding member 50, thereby preventing the back face 2b side end portion of the cartridge holding member 50 from being closed while inserting the tape cartridge 3. On the other hand, when the cartridge holding member 50 is lowered to the loading position, the antidust sheet 69 drapes over the upper face portion 53 of the cartridge holding member 50 to cover the clearance formed between the top plate 68 and the cartridge holding member 50. Accordingly, the antidust sheet 69 prevents dust and the like, which enter through the insertion/ejection opening section 10, from entering into the drive area 42 through the opening portion in the partition 40.

Figure 11:
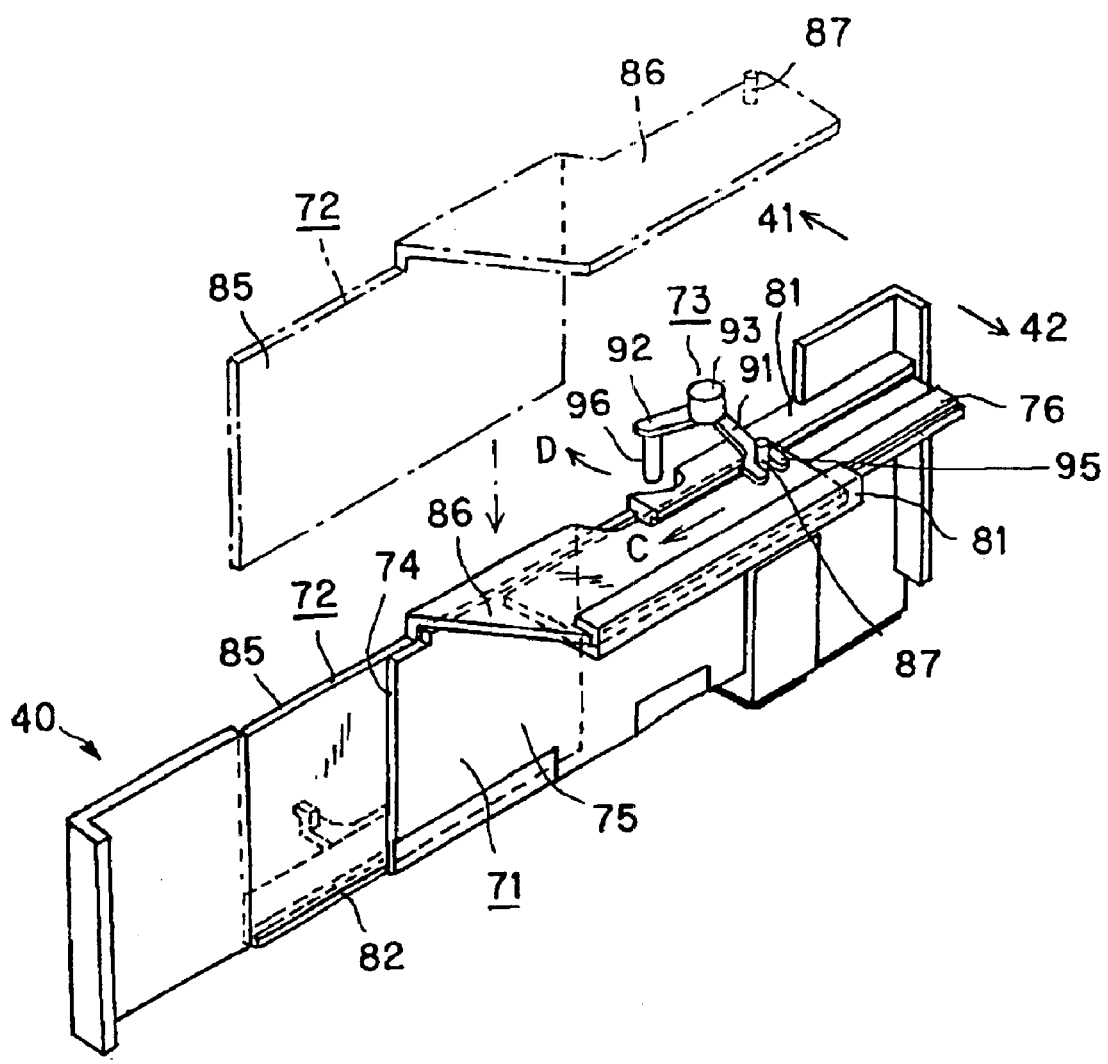
FIG. 11 is a perspective view showing a partition.

As illustrated in FIG. 11, the partition 40 formed between the tape loading area 41, in which the cartridge loading mechanism 4 is provided, and the drive area 42, in which the rotary magnetic head mechanism 6, the take-up reel 7 and the feeding mechanism 8, all of which will be described later, are disposed, has a partition 71 for dividing the tape loading area 41 and the drive area 42, a shutter member 72 which opens or closes an opening formed in the partition 71 and through which the magnetic tape 5 is pulled out, and a shutter opening/closing arm 73 for actuating the shutter member 72.

As illustrated in FIG. 11, the partition 71 includes a generally rectangular wall 75 in which an opening portion 74 is formed and a guide rail 76 which guides the movement of the shutter member 72. In the partition 71, the wall 75 is essentially the same length as the transverse length of the main body of the apparatus and extends over the entire width of the main body of the apparatus. Also, the partition 71 is covered entirely by a hood member 77 as illustrated in FIG. 2. The hood member 77 has a gasket formed at the upper face portion and the side surface portion, which contact the outer housing of the main body 2 of the apparatus. Accordingly, the partition 71 can reliably prevent any gas from entering into the drive area 42 from the tape loading area 41.

The partition 71 also has the opening portion 74 formed in correspondence with the opening 15 of the tape cartridge 3 which is loaded into the cartridge holding member 50 carried to the loading position. The opening portion 74 is formed in a sufficient size for allowing the tape pulling member of the carrying mechanism 8 to enter and to carry the leader block 13. The opening portion 74 is opened or closed by the shutter member 72 in accordance with the insertion/ejection of the tape cartridge 3.

The partition 71 has the guide rail 76 for guiding the shutter member 72. The guide rail 76 has a substantially rectangular shape and is formed such that it protrudes toward the drive area 42 from the upper edge portion of the partition 71. The guide rail 76 has a guide portion 81 formed at both side edge portions in the longitudinal direction along the opening/closing direction of the shutter member 72. The guide portion 81 has a cross section that loosely resembles a horseshoe, and the plate shaped shutter member 72 is inserted in a movable manner.

The partition 71 has a guide groove 82 formed for guiding the movement of the shutter member 72. The guide groove 82 is formed at the lower edge portion on the tape loading area 41 side and extends in the opening/closing direction of the shutter member 72. The guide groove 82 is formed in substantially an L-shape and the lower edge portion of the shutter member 72 is provided thereon so as to be movable.

As illustrated in FIG. 11, the shutter member 72 for opening and closing the opening portion 74, which is formed in the partition 71, has a substantially rectangular shutter portion 85 and an actuation plate portion 86, which is inserted into the guide rail 76. The actuation plate portion 86 is actuated to open and close the shutter portion 85 by the shutter opening/closing arm 73, which will be described hereinafter. The shutter member 72 is formed with the actuation plate portion 86 at a right angle from the upper edge portion of the shutter portion 85. The shutter portion 85 of the shutter member 72 is disposed in the guide groove 82 formed in the partition 71, while the actuation plate portion 86, which is formed on the drive area 42 side, is inserted into the guide portion 81 of the guide rail 76.

The upper edge of the shutter portion 85 is at the same height as the partition 71 when it is inserted into the guide groove 82. When the shutter member 72 is moved by the shutter opening/closing arm 73 in the closing direction, the opening portion 74 is closed securely.

The actuation plate portion 86, which actuates to open and close the shutter portion 85, has an actuation shaft 87, which engages with the shutter opening/closing arm 73 that actuates the shutter member 72 to open or close it, formed to protrude between the guide portions 81 formed at both side edge portions of the guide rail 76. The shutter member 72 opens and closes the opening portion 74 by having the actuation shaft 87 moved by the shutter opening/closing arm 73 in the opening/closing direction of the shutter portion 85.

The shutter opening/closing arm 73 engages with the actuation shaft 87 provided on the actuation plate portion 86 of the shutter member 72. The shutter opening/closing arm 73 has an actuation arm 91 for actuating the shutter member 72, a swivel shaft 92 for swiveling the actuation arm 91 in response to the insertion/ejection of the tape cartridge 3 and a pivot 93 which acts as a pivot for the swivel shaft 92 and the actuation arm 91.

The actuation arm 91 has its base end pivotally supported by the pivot 93, and an engaging portion 95 for engaging with the actuation shaft 87 provided on the actuation plate portion 86 is formed on the free end of the actuation arm 91. The swivel shaft 92 has the base end pivotally supported by the pivot 93 and the free end extends towards the tape loading area 41. A push portion 96 is formed at the free end of the swivel shaft 92. The push portion 96 extends towards the inside of the cartridge holding member 50 an opening 68a in the top plate 68, and is pressed by the tape cartridge 3. The pivot 93 is attached to a plate 97 formed so as to extend over the opening 68a in the top plate 68. The pivot 93 pivotally supports the base ends of the actuation arm 91 and the swivel shaft 92. Also, the pivot 93 constantly biases the actuation arm 91 and the swivel shaft 92 in the direction indicated by arrow D in FIG. 11 by a biasing member (not shown in FIG. 11). Accordingly, the shutter opening/closing arm 73 constantly biases the shutter member 72 by the actuation arm 91 in the direction indicated by arrow C shown in FIG. 11 so as to close the opening portion 74.

When the tape cartridge 3 is loaded into the cartridge holding member 50, the push portion 96 of the swivel shaft 92 which extends into the cartridge holding member 50 is pushed in the direction opposite to the direction indicated by arrow D shown in FIG. 11 towards the partition 71 by the insertion end side surface 14a of the tape cartridge 3. As a result, this causes the swivel shaft 92 to swivel in the direction opposite to arrow D shown in FIG. 11, while the actuation arm 91 swivels in the direction opposite to the direction indicated by arrow C in FIG. 11. As the actuation arm 91 swivels, the actuation shaft 87, which is engaged with the engaging portion 95 of the actuation arm 91, moves in the direction opposite to arrow C shown in FIG. 11, thereby opening the opening portion 74 of the shutter portion 85. Subsequently, as will be described hereinafter, the tape pulling member enters into the opening portion 74 and pulls out the magnetic tape 5 from the tape cartridge 3.

It is to be noted that, in the recording and/or reproducing apparatus 1, the drive area 42 is kept very airtight because the clearance between the cartridge holding member 50 and the top plate 68 is covered with the antidust sheet 69.

On the other hand, when the tape cartridge 3 is ejected from the cartridge holding member 50, the push portion 96 of the swivel shaft 92, which extends into the cartridge holding member 50, is released from the biasing force and the swivel shaft 92 is biased by a biasing member (not shown) of the pivot 93 in the direction indicated by arrow D shown in FIG. 11. This forces the actuation arm 91 to swivel in the direction indicated by arrow C shown in FIG. 11, thereby moving the actuation shaft 87, which is engaged with the engaging portion 95 of the actuation arm 91, in the direction of arrow C shown in FIG. 11 and closing the opening portion 74 with the shutter portion 85. Accordingly, when the tape cartridge 3 is not loaded, the recording and/or reproducing apparatus 1 keeps the drive area 42 very airtight.

Figure 12:
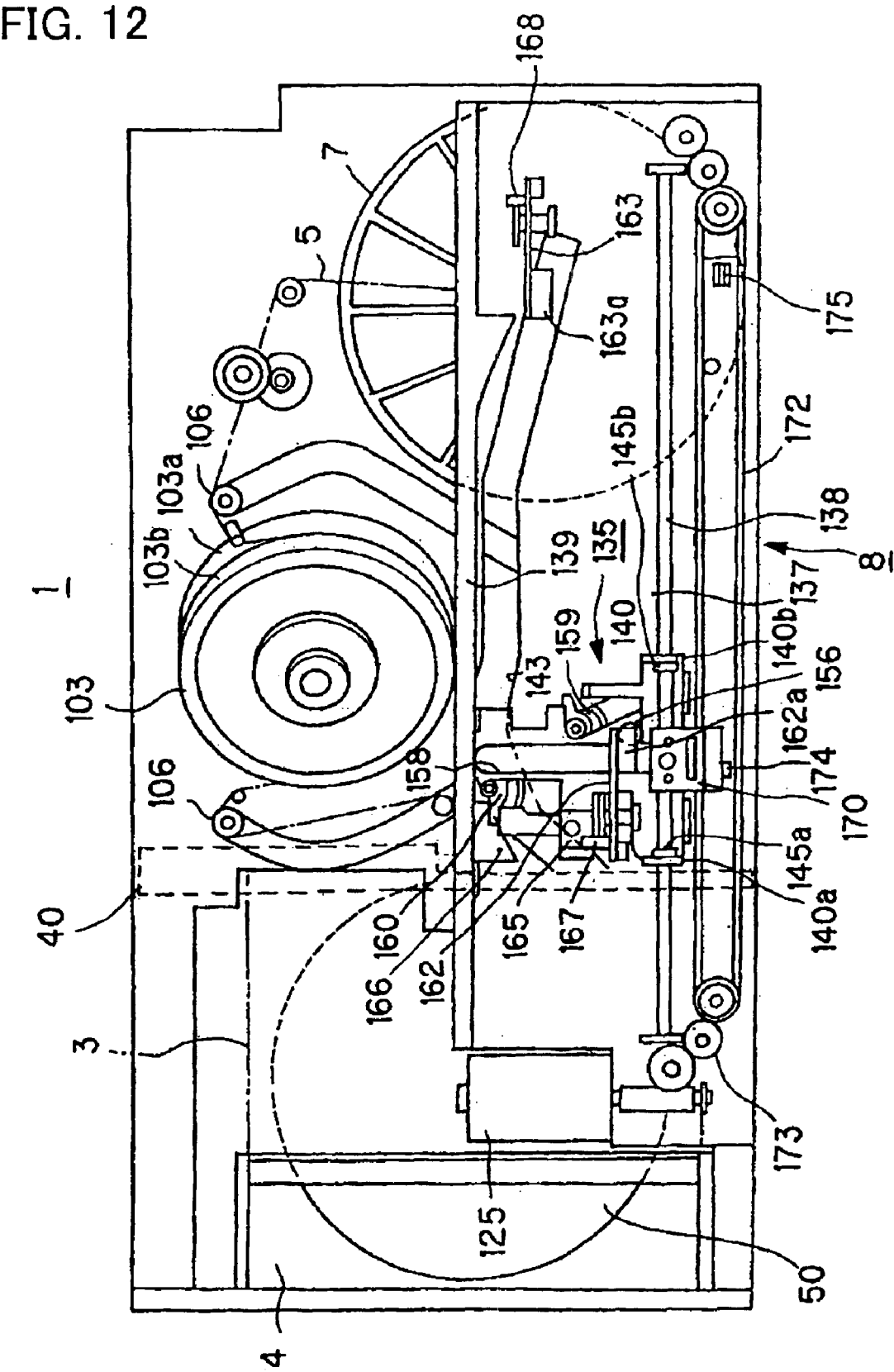
FIG. 12 is a top plan view of the interior of a main body 2.

The rotary magnetic head mechanism 6 for recording or reproducing information signals through sliding contact with the magnetic tape 5 is disposed between the cartridge holding member 50 and the take-up reel 7. As illustrated in FIG. 12, the rotary magnetic head mechanism 6 is equipped with a rotary magnetic head unit 103 including at least a stationary drum 103a and a rotary drum 103b, which rotates in relation to the stationary drum 103a. The rotary drum 103b has a plurality of magnetic heads for recording or reproducing information signals on or from the magnetic tape 5.

Disposed at both sides of the rotary magnetic head mechanism 6 are loading pins 106 which constitute a tape loading mechanism. By way of these loading pins 106, the magnetic tape 5 that is pulled out of the tape cartridge 3 and fed to the take-up reel 7 by the carrying mechanism 8 is loaded in a substantially M-formed shape. The magnetic tape 5 that is loaded in a substantially M-formed shape by the loading pins 106 is guided by a plurality of guide pins and guide rollers before being wound around the take-up reel 7.

Figure 16:
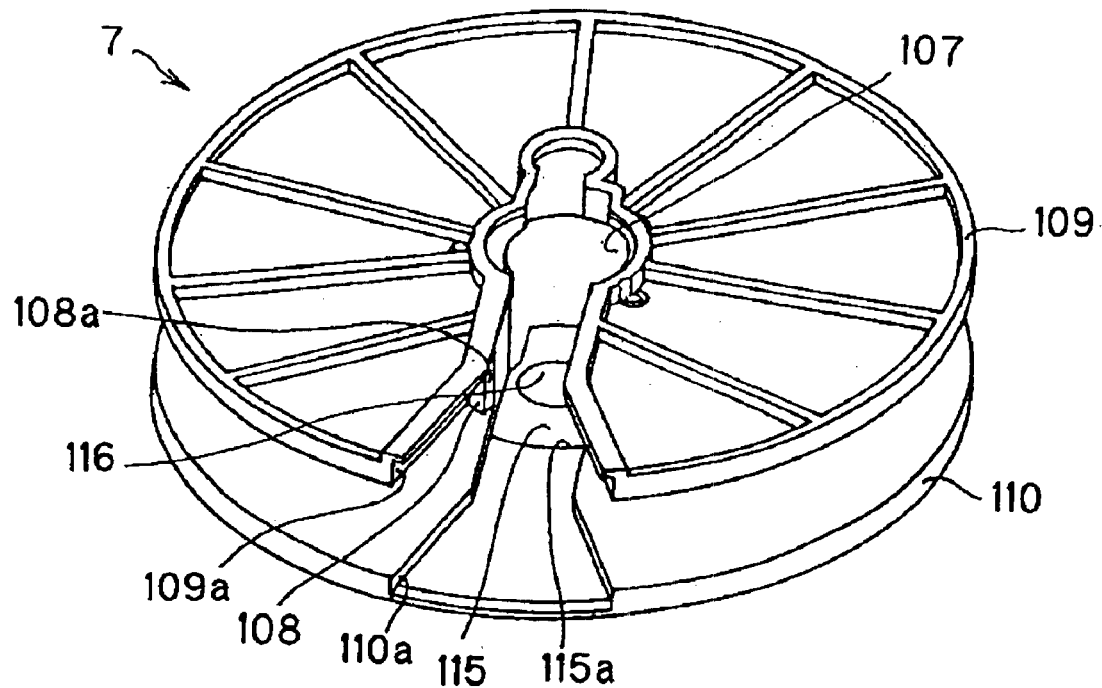
FIG. 16 is a perspective view of a take-up reel.

As illustrated in FIG. 16, the take-up reel 7 for winding the magnetic tape 5 fed into the recording and/or reproducing apparatus 1 has a reel hub 108, in which a leader block holding portion 107 for receiving and holding the leader block 13 is formed, and a pair of upper and lower reel flanges 109 and 110, which are attached to both ends of the reel hub 108.

The leader block holding portion 107, which receives the leader block 13, has an open end 108a where part of the reel hub 108 is open. The leader block holding portion 107 is provided inside the reel hub 108 for receiving the leader block 13 and is continuous with the open end 108a.

The pair of upper and lower reel flanges 109 and 110 are attached to both ends of the reel hub 108 to assist the winding of the magnetic tape 5, which is pulled out by the tape pulling member, around the reel hub 108. The reel flanges 109 and 110 have guide channels 109a and 110a that are continuous with the open end 108a of the reel hub 108, and the guide channels 109a and 110a guide the leader block 13 to the leader block holding portion 107. The guide channels 109a and 110a are formed by removing part of the outer peripheral portion of the reel flanges 109 and 110 towards the center, and the leader block 13 that is carried and guided to the leader block holding portion 107 by the carrying mechanism 8 of the main body 2 enters into these guide channels 109a and 110a. Since the guide channels 109a and 110a are formed in such a manner that they taper towards the center, the take-up reel 7 into which the leader block 13 enters can be positioned easily, and the leader block 13 is able to enter smoothly.

Moreover, at the center portion of the lower reel flange 110 is formed a recessed engaging portion 115 which engages with the lower side portion of the leader block 13. The leader block 13 inserted into the leader block holding portion 107 is positioned at the engaging portion 115. In this way, the leader block 13 is engaged with an engaging step portion 115a of the engaging portion 115, whose lower side is recessed, even if the engagement between the leader block 13 and the engaging shaft of the tape pulling member is released, thereby preventing leader block 13 from being pulled out of the leader block holding portion 107 even if the magnetic tape 5 is pulled in the ejecting direction by the back tension of the magnetic tape 5.

Also formed at the center portion of the recessed engaging portion 115 is an opening 116 which acts as an escaping hole for an engaging shaft 152 of a tape pulling member 150, which is pulled out from the cartridge main body 11 and is engaged with the leader block 13, in releasing the engagement with the leader block 13 within the take-up reel 7.

Figure 17:
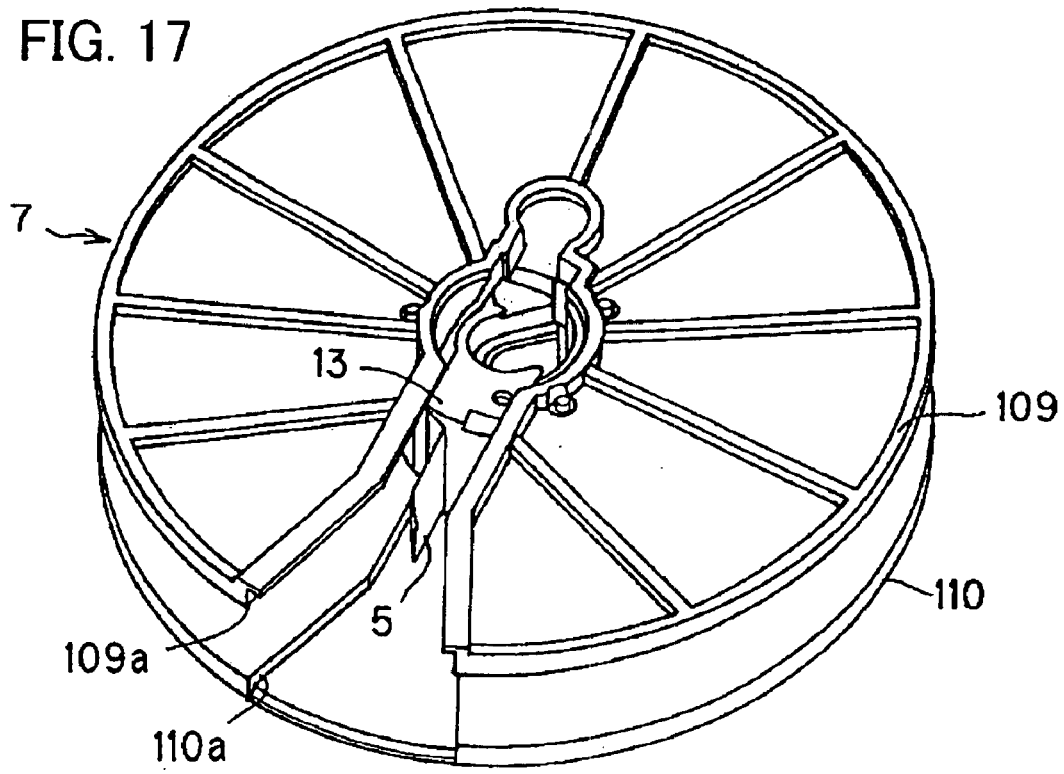
FIG. 17 is a perspective view illustrating a state in which a leader block is inserted in a take-up reel.

When the leader block 13 engaged with the engaging shaft of the tape pulling member is carried to the take-up reel 7 of such a configuration by the carrying mechanism 8, as illustrated in FIG. 17, the leader block 13 enters into the guide channels 109a and 110a which are rotated in advance to face the direction from which the leader block 13 is carried.

Subsequently, the leader block 13, which is guided by the guide channels 109a and 110a, enters inside the leader block holding member 107. At this point, the engagement between the leader block 13 and the engaging shaft of the tape pulling member is released. However, by being engaged with the engaging step portion 115a of the recessed engaging portion 115, the leader block 13 is prevented from being ejected from the take-up reel 7 due to the back tension in the magnetic tape 5 which is wound around the tape reel 12 of the cartridge main body 11. The take-up reel 7 then winds the magnetic tape 5 by being rotated by a drive mechanism which is not shown in the drawings.

Next, a description of the carrying mechanism 8 for carrying the magnetic tape 5 wound in the tape cartridge 3 that is loaded into the cartridge loading mechanism 41 will be given.

The carrying mechanism 8, which engages with the leader block 13 provided at the tip of the magnetic tape 5 and carries the leader block 13 between the tape cartridge 3 and the take-up reel 7, is disposed on a plate 137 as illustrated in FIG. 12. The carrying mechanism 8 includes a carrying portion 135, which engages with the leader block 13 attached to the tip of the magnetic tape 5 in the tape cartridge 3 and carries the leader block 13 between the tape cartridge 3 and the take-up reel 7, and a chucking mechanism 136, which engages the leader block 13 and the tape pulling member 150 in conjunction with the movement of the feeding mechanism 135 or releases this engagement.

Figure 13:
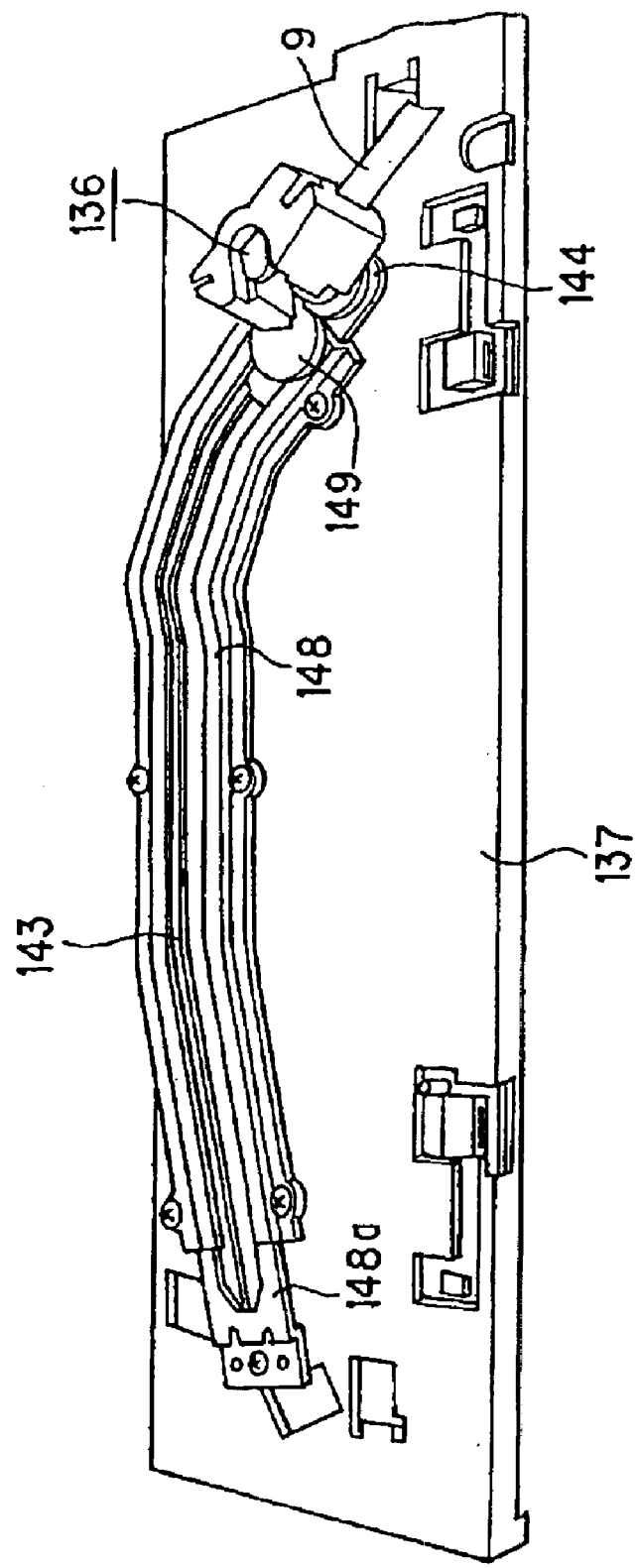
FIG. 13 is a perspective view showing, from below, a carrying mechanism provided with a carrying portion and a chucking mechanism.
Figure 14:
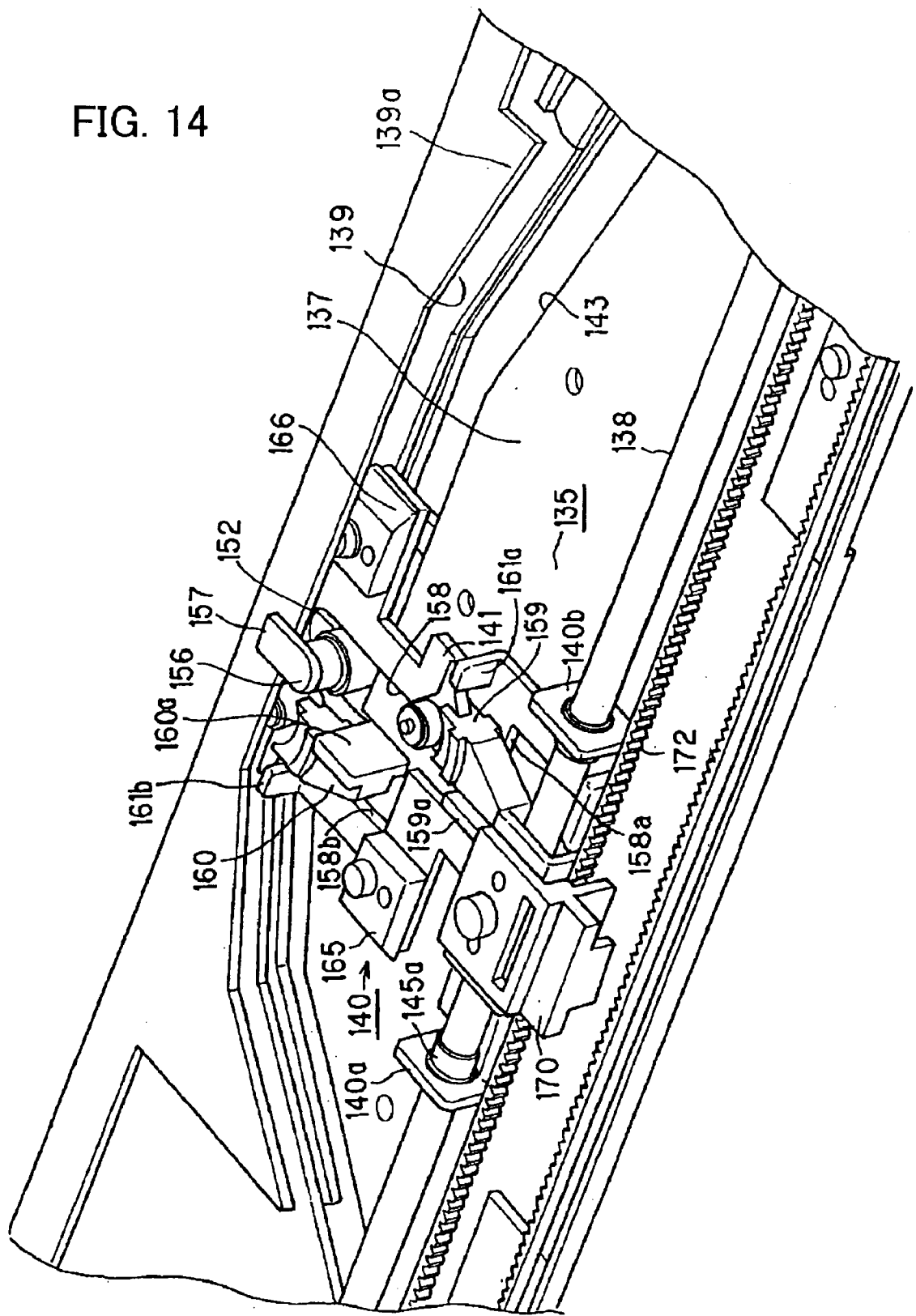
FIG. 14 is a perspective view showing a carrying mechanism from above.

As illustrated in FIG. 12 through FIG. 14, the plate 137, on which the carrying mechanism 8 is disposed, is formed of a generally rectangular flat plate and has a cam channel 143 along which the tape pulling member 150 engaged with the leader block 13 moves and a recessed guide portion 139 for guiding the carrying portion 135 which carries the tape pulling member 150.

As illustrated in FIG. 12, the cam channel 143 extends from around the opening 15 in the tape cartridge 3 loaded into the cartridge loading portion 51, passes through the vicinity of the rotary magnetic head mechanism 6, and bends towards the center portion of the take-up reel 7. As illustrated in FIG. 13, the cam channel 143 is disposed in such a manner that the cam channel 143 is placed between a moving mechanism 140 and a plate 144 of the carrying portion 135. A guide rail 148 for guiding the plate 144 is formed on the back surface of the plate 137. The guide rail 148 is provided with a stopper plate 148a on one end of the cam channel 143, and a flange portion 149 of the plate 144 comes into contact with the stopper plate 148a.

Figure 15:
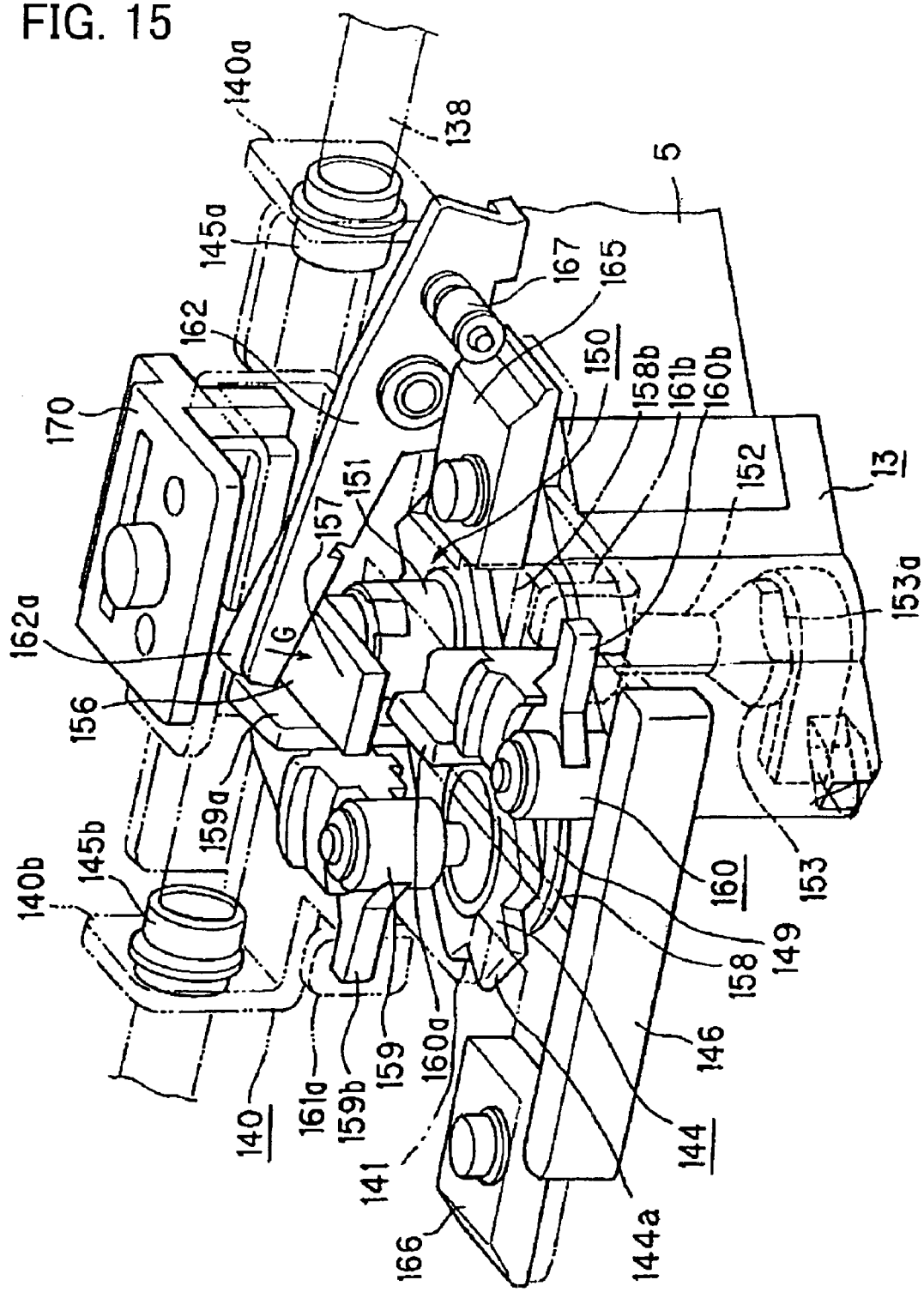
FIG. 15 is a perspective view of a carrying mechanism.

As illustrated in FIG. 12 and FIG. 14, the plate 137 has a guide shaft 138 formed along the edge portion opposite to the cam channel 143 in the longitudinal direction, and the guide shaft 138 guides the movement of the moving mechanism 140. The guide shaft 138 is disposed on the plate 137 from above the cartridge loading member 50 to above the take-up reel 7. As illustrated in FIG. 15, the guide shaft 138 is a substantially round rod, which is movably inserted into raising portions 140a and 140b and bearings 145a and 145b. And the guide shaft 138 guides the movement of the moving mechanism 140, which holds the magnetic tape 5, between the cartridge main body 11 and the take-up reel 7.

As illustrated in FIG. 14, the plate 137 has the recessed guide portion 139 formed along the side edge portion adjacent to the cam channel 143 in the longitudinal direction for guiding the movement of the moving mechanism 140. The recessed guide portion 139 includes a guide plate 139a, which is raised on the top surface side of the plate 137 and folded so that its cross section loosely resembles a horseshoe, and the plate 137. The recessed guide portion 139 is configured to slidably receive the guide member 146 of the moving mechanism 140, which will be described hereinafter. The guide plate 139a, which constitutes part of the recessed guide portion 139, is formed to protrude towards the inner side of the plate 137 along the cam channel 143. By having a lock release prevention plate 157 provided on the push portion 156 of the tape pulling member 150, which is carried along the cam channel 143, protrude over the guide plate 139a, the push portion 156 is pushed, thereby preventing the engaging shaft 152 and the leader block 13 from becoming disengaged while the leader block 13 is carried.

As illustrated in FIG. 12 and FIG. 15, engagement releasing levers 162 and 163, which disengage the leader block 13 and the tape pulling member 150, are also provided on the plate 137. The engagement releasing levers 162 and 163 are formed with levers having pressing surface portions 162a and 163a for pressing the push portion 156 of the tape pulling member 150, and these levers are pivotally supported. The pressing surface portions 162a and 163a provided on the tip of the levers are biased upward by spring members or the like. Rollers 167 and 168, which run upon cam members 165 and 166 provided on the moving mechanism 140, are provided on the other ends of the levers 162 and 163. When the rollers 167 and 168 run upon the cam members 165 and 166, the pressing surface portions 162a and 163a on the tip of the levers of the engagement releasing levers 162 and 163 are biased in the direction of arrow G illustrated in FIG. 8 and FIG. 15. As a result, the push portion 156 of the tape pulling member 150 is depressed to release the engagement between the tape pulling member 150 and the leader block 13.

As illustrated in FIG. 14 and FIG. 15, the carrying portion 135 movably disposed on the plate 137 for carrying the tape pulling member 150, which is engaged with the leader block 13, between the tape cartridge 3 and the take-up reel 7 has the moving mechanism 140, which moves over the plate 137 by being guided by the guide shaft 138, disposed on the plate 137, and the plate 144, which supports the tape pulling member 150, which will be described later, inserted therethrough and slides in conjunction by way of the moving mechanism 140 and the plate 137. And the carrying portion 135 is configured such that the push portion 156 provided at the tip of the tape pulling member 150, which is inserted through and supported by the plate 144, is movably inserted into the guide channel 158 formed in the moving mechanism 140, and the moving mechanism 140 and the plate 144 are positioned with the cam channel 143 of the plate 137 in between.

The moving mechanism 140, which moves over the plate 137 between the cartridge loading member 50 and the take-up reel 7, includes a base plate 141 having a guide groove 158 into which the tape pulling member 150 is movably inserted, a pair of rotary guide members 159 and 160 provided on the base plate 141 and which guide the tape pulling member 150 along the guide groove 158, and the cam members 165 and 166 onto which the rollers 167 and 168 of the engagement releasing levers 162 and 163 run.

The guide groove 158 into which the tape pulling member 150 is inserted is formed perpendicular to the moving direction of the base plate 141 in order to guide the movement of the tape pulling member 150 and has branching groove portions 158a and 158b extending in the moving direction of the base plate 141. The guide groove 158 is configured to guide the tape pulling member 150 to the branching groove portion 158a or 158b when the moving mechanism 140 is moved closer to the cartridge loading member 50 or the take-up reel 7 and makes the push portion 156 of the tape pulling member 150 depressible by the engagement releasing levers 162 and 163.

The rotary guide members 159 and 160, which guide the tape pulling member 150 along the guide groove 158, include guide surfaces 159a and 160a, which come into contact with the push portion 156 of the tape pulling member 150, and stopper arm portions 159b and 160b, which restrict the rotation of the rotary guide members 159 and 160. The guide surfaces 159a and 160a are constantly biased towards the guide groove 158 side by coil springs or the like, and the branching groove portions 158a and 158b are closed by having the stopper arm portions 159b and 160b abut against stopper surfaces 161a and 161b, which are formed to rise from the base plate 141. When the moving mechanism 140 is moved closer to the cartridge loading member 50 or the take-up reel 7, the guide surfaces 159a and 160a are depressed and rotated by the tape pulling member 150 guided by the guide groove 158, thereby opening the branching groove portions 158a and 158b to the tape pulling member 150.

The cam members 165 and 166 for making the pressing surface portions 162a and 163a of the engagement releasing levers 162 and 163 descend each have a slanted surface upon which the roller 167 or 168 of the engagement releasing levers 162 and 163 can run. When the moving mechanism 140 is moved near the engagement releasing lever 162 or 163, the roller 167 or 168 run upon the cam member 165 or 166. When the roller 167 or 168 is pushed up by running upon the cam member 165 or 166, the pressing surface portion 162a or 163a of the engagement releasing lever 162 or 163 is biased in the direction indicated by arrow G in FIG. 15, and depresses the push portion 156 of the tape pulling member 150.

The moving mechanism 140 is coupled with a timing belt 172 of a drive mechanism 171 by way of a holding member 170. The moving mechanism 140 is moved between the sides on which the cartridge loading member 50 and the take-up reel 7 are located by having the timing belt 172 of the drive mechanism 171 driven.

The drive mechanism 171 is configured to rotate the timing belt 172 by having a gear mechanism 173 driven to rotate by a motor 125, shown in FIG. 12, for moving the leader block. The drive mechanism 171 is controlled by having the holding member 170 of the moving mechanism 140 be associated with position sensors 174 and 175, which are disposed on the plate 137 on the sides on which the cartridge loading member 50 and the take-up reel 7 are located.

The moving mechanism 140 is also provided with the guide member 146 to be received in the recessed guide portion 139, which is formed on the plate 137 to have a substantially C-shaped cross section. The surface of the guide member 146 that contacts the recessed guide portion 139 is formed with a smooth resin, and the guide member 146 guides the movement of the moving mechanism 140.

As illustrated in FIG. 15, the plate 144 that carries the leader block 13 in conjunction with the moving mechanism 140 includes a substantially rectangular carrying plate 144a and the tape pulling member 150, which is inserted into the carrying plate 144a and is engaged with the leader block 13. The carrying plate 144a is provided with a flange-shaped flange portion 149 on the bottom surface side, and the carrying plate 144a is provided on the plate 137 by slidably inserting the flange portion 149 between the cam channel 143 and the guide rail 148 formed in the plate 137.

Figure 18:
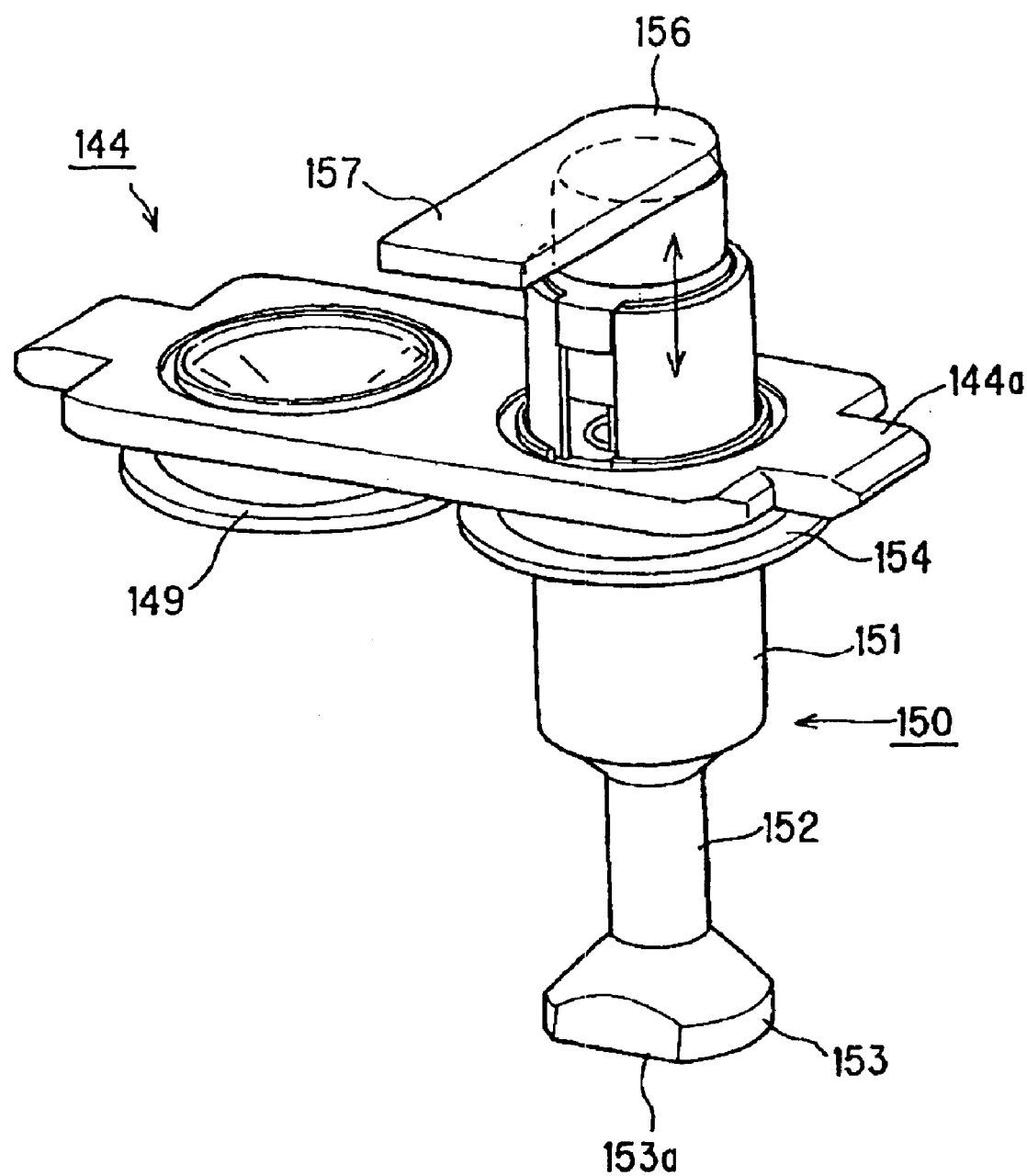
FIG. 18 is a perspective view showing a tape pulling member.

As illustrated in FIG. 18, the tape pulling member 150, which is inserted into the carrying plate 144a and engages with the leader block 13, includes a sleeve 151, the engaging shaft 152, which is inserted into the sleeve 151 and engages with the leader block 13, and a lock release prevention plate 157 formed at the tip portion of the engaging shaft 152 for preventing the leader block 13 from becoming disengaged while being carried.

The sleeve 151 is inserted through the carrying plate 144a on the bottom surface side of which the flange portion 154, which is slidably inserted in the cam channel 143 and the guide rail 148 formed on the plate 137, is provided.

The engaging shaft 152 is constructed to be constantly biased upward in FIG. 18 by a biasing member, such as, for example, a compressed coil spring, received in the sleeve 151 so as to be slidable in the direction of the shaft.

Provided at the lower end of the engaging shaft 152 is a flange 153 which engages with the lower engaging step portion 33 of the leader block 13. As illustrated in FIG. 18, the flange 153 is provided with a chamfered portion 153a.

The tape pulling member 150 is also provided with the push portion 156 at the top portion of the sleeve 151. While the tape pulling member 150 is biased upward, the push portion 156 protrudes from the upper surface by being inserted, via the cam channel 143, through the guide groove 158, which is formed in the crossing direction with respect to the cam channel 143 in the plate 137 of the moving mechanism 140. Moreover, the push portion 156 has the lock release prevention plate 157 formed in a protruding manner. The lock release prevention plate 157 is a generally plate-shaped member. When the push portion 156 is made to protrude from the upper surface side of the moving mechanism 140, the lock release prevention plate 157 protrudes above the recessed guide portion 139 formed in the plate 137. Thus, even if a force is applied to the push portion 156 while the leader block 13 is carried, the push portion 156 is not pressed, and the tape pulling member 150 is able to prevent the leader block 13 from becoming disengaged.

Figure 19:
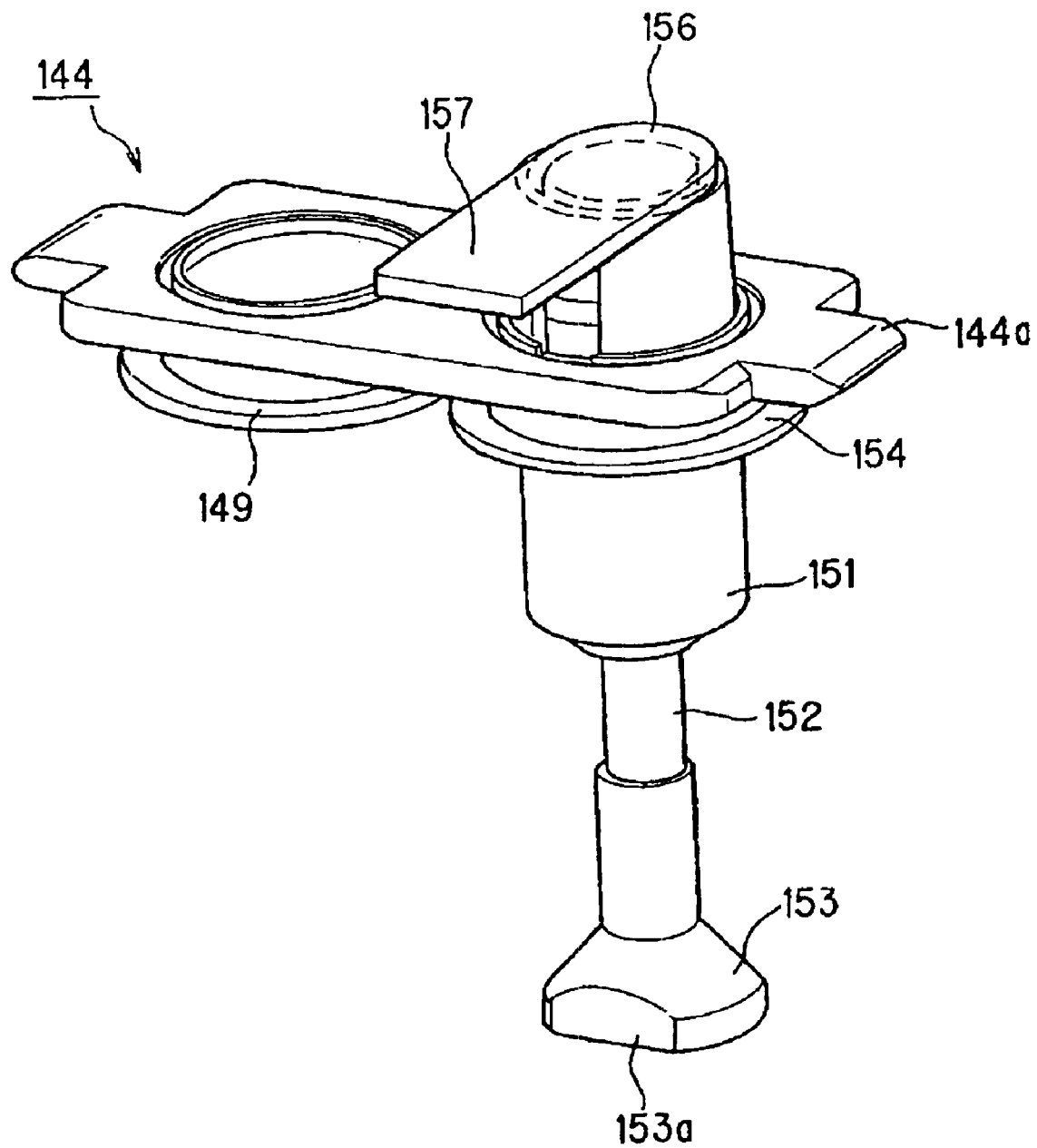
FIG. 19 is a perspective view showing a tape pulling member.
Figure 20:
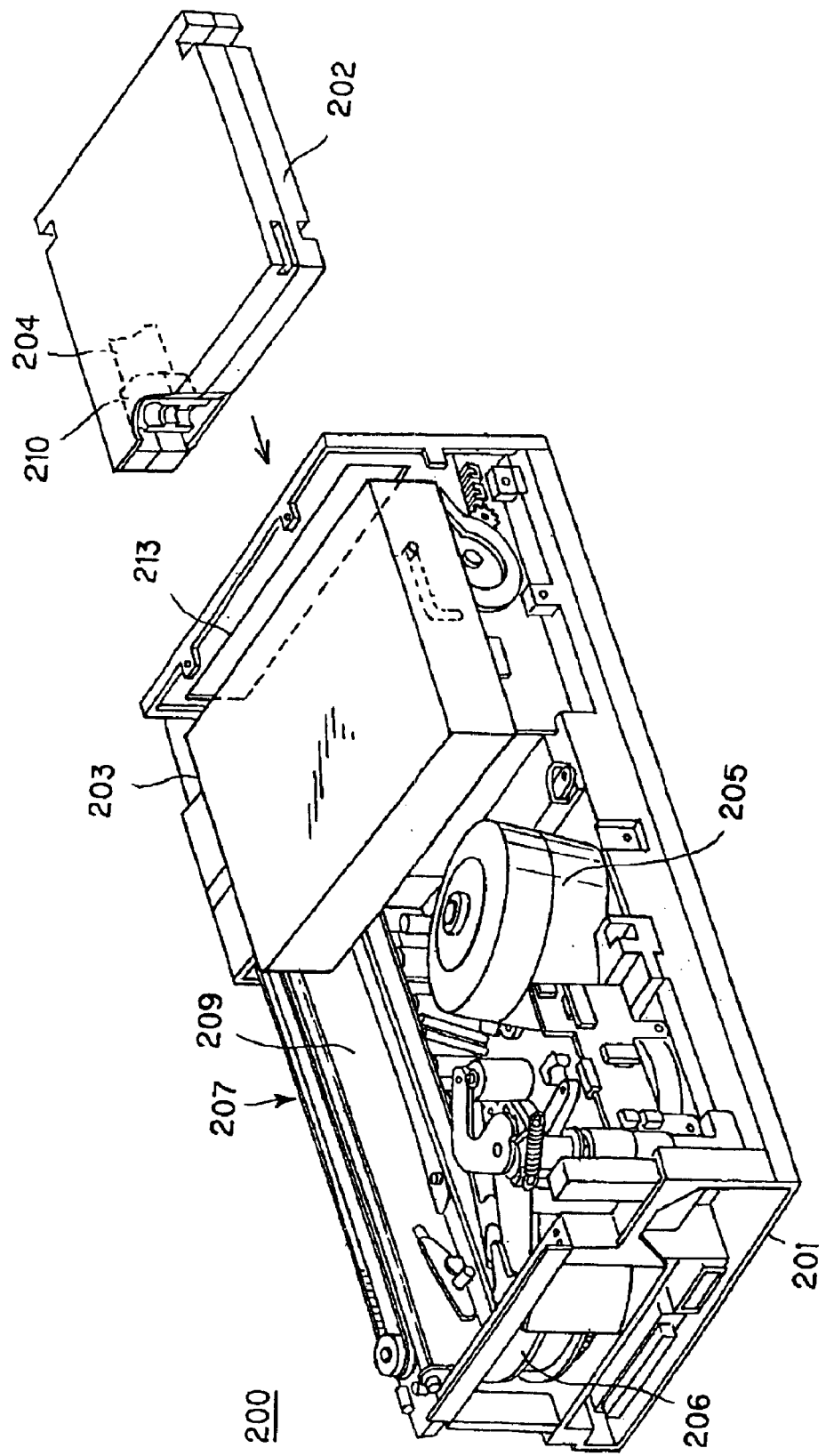
FIG. 20 is a perspective view showing a conventional recording and/or reproducing apparatus.

As illustrated in FIG. 19, when the push portion 156 is pressed, the tape pulling member 150 extends downward and is made capable of being inserted into the engaging portion 31 of the leader block 13. When inserted into the engaging portion 31, the engaging shaft 152 contracts upward due to elastic recovery of the push portion 156, thereby engaging with the leader block 13 as the flange 153 engages with the positioning step portion 35 of the leader block 13. At this point, the chamfered portion 153a formed on the flange 153 comes into contact with the rotation restriction portion 36, which is formed on the positioning step portion 35. As a result, positioning of the leader block 13, which is engaged with the tape pulling member 150, is established and the tape pulling member 150 is able to prevent the leader block 13 from moving about or becoming disengaged while being carried.

By being inserted into the guide groove 158 of the moving mechanism 140, the tape pulling member 150 is moved along the cam channel 143 between the cartridge main body 11 and the take-up reel 7 in conjunction with the movement of the moving mechanism 140. In other words, the tape pulling member 150 stands by immediately before the opening portion 74 until the tape cartridge 3 is loaded into the cartridge holding member 50 and the opening portion 74 in the partition 40 opens up. When the tape cartridge 3 is loaded into the cartridge holding member 50 and the shutter member 72 is moved to open the opening portion 74 in the partition 40, the tape pulling member 150 enters into the cartridge loading area 41 through the opening portion 74 and also enters inside the opening 15 of the tape cartridge 3.

On the other hand, when the push portion 156 is pressed by the pressing surface portion 162a or 163a of the engagement releasing lever 162 or 163, the tape pulling member 150 is biased downward to enter into the engaging portion 31 of the leader block 13. The bottom surface side of the sleeve 151 is then supported by the upper engaging step portion 32 of the leader block 13 and the flange 153 is supported by the lower engaging step portion 33 of the leader block 13. Subsequently, by releasing the biasing force of the engagement releasing lever 162 or 163, the tape pulling member 150 is biased upward by the biasing force of the biasing member that is received in the sleeve 151, thereby engaging with the leader block 13. At this point, the chamfered portion 153a formed on the flange 153 abuts against the rotation restriction portion 36 of the leader block 13, thereby preventing the leader block 13 from moving about while being carried.

When the push portion 156 is pushed down by the pressing surface portion 162a or 163a of the engagement releasing lever 162 or 163, the tape pulling member 150, which is in engagement with the leader block 13, is biased downward to eject the flange 153 from the positioning step portion 35, thereby releasing the engagement with the leader block 13.

The carrying mechanism 8 having the above construction stands by in the following condition before the tape cartridge 3 is inserted.

The tape pulling member 150 stands by immediately before the opening portion 74 until the tape cartridge 3 is loaded into the cartridge holding member 50 and the opening portion 74 in the partition 40 is opened. At this point, the cam member 165 in the moving mechanism 140 biases the pressing surface portion 162a provided at the tip of the lever downward by having the roller 167 of the engagement releasing lever 162 provided on the plate 137 run upon the cam member 165. When the pressing surface portion 162a is biased downward, the push portion 156 provided at the tip of the tape pulling member 150 is pressed and the flange 153 of the engaging shaft 152 is also biased downward.

Subsequently, when the tape cartridge 3 is loaded into the cartridge holding member 50 and the shutter member 72 is moved to open up the opening portion 74 in the partition 40, the tape pulling member 150 moves into the cartridge loading area 41 through the opening portion 74 and also enters into the opening 15 of the tape cartridge 3. The engaging shaft 152 is inserted into the engaging portion 31 of the leader block 13, the biasing force of the engagement releasing lever 162 is released as the moving mechanism 140 starts to move towards the take-up reel 7, and the engaging shaft thereby engages with the leader block 13. At this point, the chamfered portion 153a, which is formed on the flange 153, comes into contact with the rotation restriction portion 36 formed on the positioning step portion 35 in the leader block 13, and the engaging shaft 152 prevents the leader block 13 from moving about.

Subsequently, as the moving mechanism 140 is moved towards the take-up reel 7, the leader block 13 engaged with the engaging shaft 152 is moved towards the take-up reel 7 together with the plate 144.

When the moving mechanism 140 carries the leader block 13 to the leader block holding portion 107 of the take-up reel 7, the cam member 166, by being run upon by the roller 168 of the engagement releasing lever 163 provided on the plate 137, biases the push surface portion 163a at the tip of the lever downward. Accordingly, the flange 153 is ejected from the positioning step portion 35 of the leader block 13 and the engaging shaft 152 is disengaged from the leader block 13.

Next, the operation of the recording and/or reproducing apparatus 1 will be described.

Before the tape cartridge 3 is inserted into the main body 2, the cartridge holding member 50 is moved to the unloading position in the main body 2 of the apparatus by the loading portion 65. At this point, in the recording and/or reproducing apparatus 1, the swivel shaft 92 of the partition 40 is biased in the direction indicated by arrow D shown in FIG. 11 by the biasing member of the pivot 93. Thus, the actuation arm 91 is also swiveled in the direction of arrow C shown in FIG. 11 and the actuation shaft 87, which is engaged with the engaging portion 95 of the actuation arm 91, moves in the direction of arrow C shown in FIG. 11, thereby closing the opening portion 74 with the shutter portion 85. As a result, in a state where the tape cartridge 3 is not loaded, the recording and/or reproducing apparatus 1 is able to maintain airtight conditions in the drive area 42.

Subsequently, when the tape cartridge 3 is loaded into the cartridge holding member 50, the push portion 96 of the swivel shaft 92 which extends into the cartridge loading member 50 is pushed in the opposite direction to arrow D shown in FIG. 11, namely towards the partition 71, by the insertion end side surface 14a of the tape cartridge 3. As a result, the swivel shaft 92 similarly swivels in the opposite direction to arrow D shown in FIG. 11 and the actuation arm 91 swivels in the direction opposite to arrow C shown in FIG. 11. As the actuation arm 91 swivels, the actuation shaft 87, which is engaged with the engaging portion 95 of the actuation arm 91, is moved in the direction opposite to arrow C shown in FIG. 11, and the shutter portion 85 opens up the opening portion 74.

When the insertion of the tape cartridge 3 into the main body 2 of the apparatus is detected, the guide pins 55 are slid along the guide grooves 61 by the feeding mechanism of the loading portion 65, and the cartridge holding member 50 is moved to the back face 2b side of the main body 2 of the apparatus.

Here, in the guide grooves 61, the guide pins 55 of the cartridge holding member 50 slide across the horizontal guide portion 62 from the end portion on the back face 2b side, and then move down the vertical guide portion 63.

Thus, the cartridge holding member 50, which holds the tape cartridge 3, is carried from the unloading position to the loading position where the magnetic tape 5 is pulled out by the tape pulling member. When the cartridge holding member 50 is carried to the loading position, the opening 15 faces the opening portion in the partition 40.

The antidust sheet 69, which is provided on the top plate 68, drapes so as to cover the clearance formed between the top plate 68 and the upper surface portion 53 of the cartridge holding member 50 by having the cartridge holding member 50 descend to the loading position. This ensures that in the recording and/or reproduction apparatus 1, even if the opening portion 74 in the partition 40 is opened in order to pull out the magnetic tape 5 into the drive area 42, the cartridge loading area 41 and the drive area 42 are isolated by the antidust sheet 69. Thus, degradation in recording or reproducing characteristics or the like caused by dust and the like entering into the drive area 42 through the insertion/ejection opening portion 10 may be prevented.

When the cartridge loading member 50 is lowered to the loading position, the reel drive section (not shown) enters through the reel drive section entry opening 54 formed in the cartridge loading portion 51 and engages with the engaging portion 22, which is formed at the bottom surface 17a side of the reel hub 17.

When it is detected that the cartridge loading member 50 has been lowered to the loading position, the tape pulling member 150 enters into the cartridge loading area 41 through the opening portion 74, and enters into the opening 15 of the tape cartridge 3.

When the tape pulling member 150 is inserted into the engaging portion 31 of the leader block 13, the moving mechanism 140 begins to be moved towards the take-up reel 7 by the motor 125. At this point, the pressure on the push portion 156 of the tape pulling member 150 is released and the engaging shaft 152 elastically recovers upward as shown with the broken line in FIG. 8. The flange 153 is inserted into the positioning step portion 35 of the leader block 13, the chamfered portion 153a of the flange 153 abuts against the rotation restriction portion 36, and the engaging shaft 152 engages with the leader block 13.

While the moving mechanism 140 is carried towards the take-up reel 7, because the lock release prevention plate 157, which is formed on the push portion 156, protrudes above the recessed guide portion 139, which is formed along the cam channel 143, the tape pulling member 150 is prevented from becoming disengaged from the leader block 13 as a result of having the push portion 156 pressed in error. Also, because the chamfered portion 153a of the flange 153 abuts against the rotation restriction portion 36 of the leader block 13, the positioning of the leader block 13 is established, and the leader block 13 is prevented from moving about while being carried.

When the moving mechanism 140 is moved towards the take-up reel 7 and the leader block 13 is inserted into the leader block holding portion 107 via the guide channels 109a and 110a of the take-up reel 7, the tape pulling member 150 is disengaged from the leader block 13 by the engagement releasing lever 163.

It is to be noted that the leader block 13 has its bottom side rear end engaged with the engaging step portion 115a of the recessed engaging portion 115 formed at the center portion of the lower reel flange 110, thereby preventing the leader block 13 from being ejected from the take-up reel 7 due to the back tension of the magnetic tape 5.

Subsequently, the magnetic tape 5, which is disposed between the tape cartridge 3 and the take-up reel 7, is guided by the loading pins 106, which are movably disposed on both sides of the rotary magnetic head mechanism 6, and is brought into contact with the rotary magnetic head mechanism 6 in an approximately M shape.

In rewinding the magnetic tape 5, the leader block 13 is similarly engaged with the tape pulling member 150 and is carried into the cartridge main body 11 by having the moving mechanism 140 moved.

When ejecting the tape cartridge 3 from the recording and/or reproducing apparatus 1, the guide pins 55 of the cartridge holding member 50 are moved to the front face 2a side from the back face 2b side of the guide grooves 61 by the loading portion 65 and the cartridge holding member 50 is carried from the loading position to the unloading position. As a result, in the recording and/or reproducing apparatus 1, the insertion end 50a of the cartridge holding member 50 is placed in alignment with the insertion/ejection opening portion 10 which is formed in the front face 2a of the main body 2 of the apparatus, and the tape cartridge 3 is ejected out of the main body 2 of the apparatus by a cartridge ejection mechanism, a detailed description of which will be omitted herein.

When the tape cartridge 3 is ejected, in the recording and/or reproducing apparatus 1, the biasing force on the push portion 96 of the swivel shaft 92 extending into the cartridge holding member 50 is released, and the swivel shaft 92 is biased by the biasing member of the pivot 93 in the direction indicated by arrow D shown in FIG. 11. As a result, the actuation arm 91 similarly swivels in the direction of arrow C shown in FIG. 11, the actuation shaft 87, which is engaged with the engaging portion 95 of the actuation arm 91, is moved in the direction of arrow C shown in FIG. 11, and the shutter portion 85 closes the opening portion 74. Accordingly, when the tape cartridge 3 is not loaded, the recording and/or reproducing apparatus 1 is able to keep the drive area 42 airtight.

Although a description is given above with respect to a particular embodiment of a recording and/or reproducing apparatus, the present invention is not limited thereto. For example, a sensor may be provided for detecting the loading of the tape cartridge 3 and an opening/closing drive mechanism that opens or closes the opening portion formed in the partition with an electrical shutter member in response to the detection result of the sensor.

It is also possible to provide a lid, which opens and closes the insertion/ejection opening portion of the main body of the apparatus, in order to further enhance antidust performance.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A recording and/or reproducing apparatus, comprising:
   a cartridge loading member provided on one side of a main body of the apparatus, and into which a tape cartridge, in which a magnetic tape having a leader block provided on one end is wound, is loaded;
   a take-up mechanism provided on the other end of the main body of the apparatus, and which winds the magnetic tape pulled out from the tape cartridge;

a carrying mechanism including an engagement shaft which engages with an engaging portion of the leader block, and tape pulling member for pulling the magnetic tape out from the tape cartridge, where the carrying mechanism carries the tape pulling member between the tape cartridge loaded into the cartridge loading member and the take-up mechanism; and a magnetic head mechanism provided between the cartridge loading member and the take-up mechanism, and which is for recording or reproducing information signals on or from the magnetic tape, wherein an area in which the cartridge loading member is formed and an area in which the take-up mechanism, the carrying mechanism and the magnetic head mechanism are formed are divided by a partition, and the partition has an opening portion through which the magnetic tape is pulled out, and a shutter mechanism for opening or closing the opening portion.

2. The recording and/or reproducing apparatus according to claim 1, further comprising a sheet provided above the cartridge loading member, and which is for covering a clearance between the cartridge loading member and a top surface portion of the main body of the apparatus.

3. The recording and/or reproducing apparatus according to claim 1, wherein when the cartridge loading member is not loaded with the tape cartridge, the tape pulling member stands by the partition in the area in which the take-up mechanism, carrying mechanism and the magnetic head mechanism are formed, and when the opening portion is opened in response to the loading of the tape cartridge, the tape pulling member enters into the cartridge loading member through the opening portion, and pulls out the magnetic tape.

* * * * *